Figure 3:
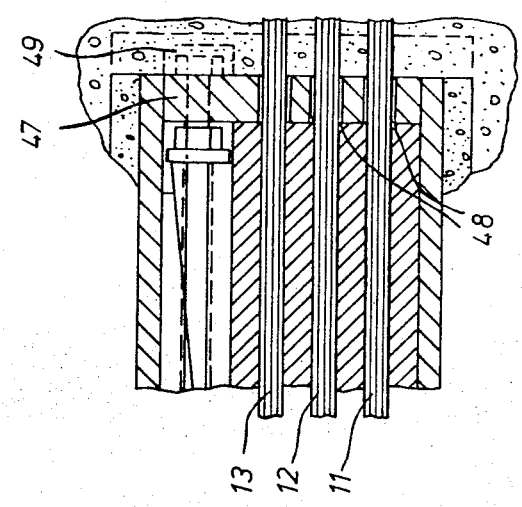

United States Patent [19]

Rehm et al.

[11] 4,448,002

[45] May 15, 1984

[54] END-ANCHORING DEVICE FOR ANCHORING AT LEAST ONE BAR MADE FROM A FIBROUS COMPOUND MATERIAL AND BEING USED AS TENDON IN PRE-STRESSED CONCRETE CONSTRUCTION

[75] Inventors: Gallus Rehm, München-Pasing; Lutz Franke, Leonberg, both of Fed. Rep. of Germany

[73] Assignee: Restra Patentverwertung GmbH, Fed. Rep. of Germany

[21] Appl. No.: 177,631

[22] Filed: Aug. 13, 1980

[30] Foreign Application Priority Data

Sep. 1, 1979 [DE] Fed. Rep. of Germany ....... 2932803
Dec. 4, 1979 [DE] Fed. Rep. of Germany ....... 2935419
Dec. 19, 1979 [DE] Fed. Rep. of Germany ....... 2950303
Dec. 19, 1979 [DE] Fed. Rep. of Germany ....... 2951088

[51] Int. Cl.³ ............................................. E04C 5/12
[52] U.S. Cl. ................................................. 52/223 L
[58] Field of Search ................. 52/223 R, 223 L, 230, 52/225

[56] References Cited

U.S. PATENT DOCUMENTS 3,099,109 7/1963 Hahn ................................ 52/223 L

FOREIGN PATENT DOCUMENTS 689768 6/1964 Canada .................................. 52/230
1091309 10/1960 Fed. Rep. of Germany .... 52/223 R
1258064 1/1968 Fed. Rep. of Germany ........ 52/230
2515423 11/1975 Fed. Rep. of Germany .... 52/223 R
549561 5/1977 U.S.S.R. ............................ 52/223 R

*Primary Examiner*—John E. Murtagh
*Attorney, Agent, or Firm*—Antonelli, Terry & Wands

[57] ABSTRACT

The present invention relates to an end-anchoring system for anchoring at least one bar made from a fibrous compound material and being used as a tendon in pre-stressed concrete construction, comprising an anchorage pot arranged for being fixed at a prestressed concrete component and containing a clamping body which extends over a portion of the length of the bar and encloses the latter and upon which transverse forces acting vertically to the longitudinal axis of the bar and producing a frictional connection between the rod and the clamping body and the anchorage pot, respectively, can be exerted, the clamping body being part of translating means for transforming axial forces into transverse forces and serving to transform forces acting upon the device in the longitudinal direction of the bar into proportional transverse forces providing the frictional connection between the rod and the clamping body.

10 Claims, 18 Drawing Figures

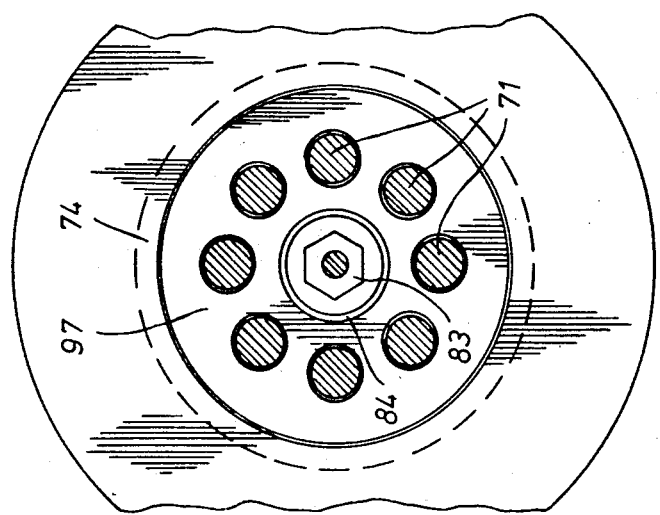
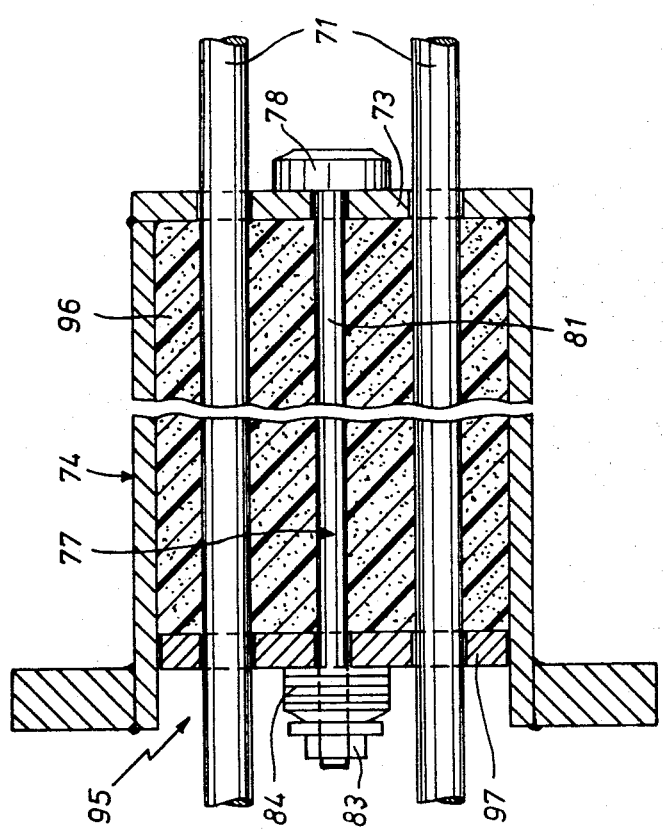
Fig.6b
Fig.6a

END-ANCHORING DEVICE FOR ANCHORING AT LEAST ONE BAR MADE FROM A FIBROUS COMPOUND MATERIAL AND BEING USED AS TENDON IN PRE-STRESSED CONCRETE CONSTRUCTION

Bars made from fibrous compound materials—glass fibres or carbon fibres poured into a resin matrix—offer high tensile strength and breaking strength in the longitudinal direction of the fibre, which in the case of glass fibre compound bars (GC bars) is in the range of approx. 1600 N/mm². Therefore, they are in principle suited for use as tendons in pre-stressed concrete construction, instead of the usual steel tendons. However, the endachorage of GC tendons under high pre-stress is a critical point as the resistance of transverse pressures and the shear strength of GC tendons is considerably lower than that of steel bars. Therefore, of all the endanchoring devices known for use with steel bars only those can be considered for use with GC tendons which provide a frictional connection between the GC tendons and a suitable anchoring body which in turn is retained or anchored in the concrete component against tensional forces. Anchoring devices of this type include for instance wedge anchoring systems and poured anchoring systems comprising an internally conical anchorage pot supported at the concrete component and enclosing the longitudinally extending tendons which in turn are fixed to the anchoring pot in the case of wedge anchoring systems by means of a generally multi-piece clamping body and, in the case of poured anchoring systems, by means of a single-piece poured cone, the transverse compression of the clamping body and the tendons as such required for frictionally fixing the GC tendons being achieved by a displacement of a clamping body by a sufficient amount in the longitudinal direction of the anchoring system.

However, considering that as a result of the breaking criteria of GC tendons, the load-bearing capacity of the latter decreases in the presence of transverse stresses and/or shearing stresses in the longitudinal direction, the end-anchorage of GC tendons offers a number of considerable disadvantages:

The tensile stress applied via the tendons to the end-anchoring systems, which is generally equal to the sum of the pre-stress imparted to the tendons and the load portion resulting from the loading of the pre-stressed concrete component, causes a displacement of the clamping body in the anchorage pot which in turn results in loadresponsive transverse pressures exerted upon the tendons. These transverse pressures are as a rule very high and may in the case of GC bars lead to a decisive reduction of the anchoring forces tolerated over long periods of time.

It is in principle possible to maintain such loadresponsive transverse pressures within reasonable limits by giving the anchoring portion of the tendons a great length and by making the conical inner face of the anchoring pot and the corresponding wedge or cone angle of the clamping bodies as steep as possible, within the limits which still permit relative gliding of the parts. However, this makes such end-anchoring device unreasonably voluminous, especially if it is designed for a bundle of several tendons, so that its use is rendered critical in the case of slim structural components. The peaks of the transverse stresses and shearing stresses encountered at the beginning of the anchoring length where the full longitudinal tensile stress is effective, are correspondingly higher in view of the lower modulus of elasticity of the GC tendons as compared to steel tendons and are particularly detrimental for GC bars. This disadvantage is still aggravated by the fact that in the case of poured anchoring systems in which the clamping body takes the form of a poured cone which fills the anchoring pot and in which the tendons are embedded, the poured mass will normally shrink and as a result thereof, the poured cone will no longer match the conical inner shape of the anchoring pot, since the absolute shrinkage is greater at the point of the largest diameter than at the point of the smallest diameter. As a result, the load-dependent transverse pressures are further increased at the point of the smaller diameter of the poured cone, i.e. on the entry side of the tendons.

Now, it is the object of the present invention to provide a device of the type mentioned above which permits gentle anchoring of GC tendons and, thus, improved utilization of the specific tensile strength of such tendons.

According to the invention, this object is achieved by the fact that the translating means for transforming axial forces into transverse forces comprises means for limiting the transverse forces to a predetermined amount.

This adjustment of the transverse forces, i.e. the limitation to that amount which on the one hand can be tolerated for a long time by the GC materials which are sensitive to transverse compression, but which on the other hand is selected as great as possible to permit the shortest possible anchoring lengths, can be achieved in accordance with a preferred embodiment of the device of the invention by an arrangement in which the force-translating or limiting means comprises at least one threshold member by which an upper barrier for the transverse force can be pre-determined so that the transverse compression of the tendon or even several tendons anchored by means of the device of the invention is prevented from exceeding the said barrier.

According to one embodiment of the invention, an anchoring device suited for this purpose is achieved by providing the force translating means with a clamping element which serves as threshold member and which can be operated from the outlet end of the anchorage pot. This clamping element serves to pre-set a clamping force of a defined value acting in the direction parallel to the longitudinal axis of the clamping member and/or the anchorage pot, the translation of which forces yields the transverse forces producing the frictional fixation of the clamping member.

The particular advantage of the device of the invention can be seen in the fact that in the arrangement of the invention its clamping element is easily accessible from the outside when the anchorage head is inserted in the recess provided for this purpose in the concrete, which already considerably facilitates the adjustment of the necessary clamping force. The force-transmitting device provided within the anchorage head ensures the exact adjustment and distribution of the clamping force. So it suffices—at least in principle—to provide only one clamping element acting upon the force-transmitting device so that the adjustment of the clamping force can be achieved with only little effort and in addition a simple design of the device is obtained.

One force-transmitting device in accordance with the invention, which uses wedges permits a well-defined adjustment of the transverse compression, even though the sliding path is relatively short. In this arrangement, the clamping element may be of a design such that re-stressing is automatically achieved, for instance by one or more biased spring plates.

In the arrangement in which the force-translating and applying means takes the form of wedge plates that can be mutually interlocked it may be convenient to give the anchorage body a rectangular cross-section and to provide tendons in the form of flat bars arranged between clamping plates. In this case, a plurality of such tendons and clamping plates may be alternately provided in a sandwich-like structure between the wedge plate arrangement and one of the outer walls of the anchorage pot. It goes without saying that such sandwich structures may also be provided on both sides of the wedge arrangement.

In a particularly advantageous embodiment of the invention, the clamping plates embrace in this case also the longitudinal edges of the tendons in the form of flat bars. This arrangement acts to prevent the tendons from separating into fibres at their longitudinal edges. When the anchoring pot is given the above-described rectangular cross-section, it is also easily possible, with the aid of two wedge plate arrangements, to achieve transverse pressures acting in two directions extending vertical to each other. In this case, it is even possible to subject tendons of square cross-section to uniform pressures.

If it is intended to have these forces absorbed on the side where the tendons enter the anchorage pot, it will suffice to make the clamping plates bear against the inner side of an abutment plate fixed to the anchorage pot at this point.

According to another embodiment of the device of the invention, the translating means for transforming axial forces into transverse forces comprises a conical sleeve which extends in the longitudinal direction of the anchorage pot and which expands when a wedge body taking the form of a truncated cone is run into it. Further, the tendon takes the form of a tie rod extending in the longitudinal direction through the wedge body and acting upon a point located between the outer base of the wedge body and the remote end face of the conical sleeve.

With the aid of this force-transmitting arrangement it is possible to fill the inner cavity of the anchorage pot with a material that can be compressed in the radial direction, in which the tendons are embedded and which offers a strength sufficient for the transmission of the forces in the longitudinal direction. In this case, the cross-sectional shape of the tendons does no longer matter. As mentioned before, the particular design of the force-transmitting means gives rise to radially directed transverse forces and oppositely directed reaction forces so that as a result the tendons are subjected to a uniform transverse compression from all sides which ensures optimum anchorage effects.

In a preferred embodiment of the device of the invention, the clamping body can be radially expanded by axial compression. It is arranged between two pressure plates provided on the entry side. At least one of the said pressure plates is guided on an end portion of the anchorage pot to slide in the axial direction and can be pressed against the other of the said plates and/or the expandible clamping/compression body, at a force that can be adjusted in a defined manner by means of the clamping element, the said clamping body filling the whole free space in the area between the compression plates and between the tendon and/or other parts of the clamping means arranged within the cavity of the anchorage pot, and that at least when a lower threshold value of the pre-stress has been reached, but preferably already in the relaxed condition.

In this embodiment of the device of the invention which leads to a quasi-hydrostatic and, thus, particularly uniform distribution of the transverse compression when a suitable material is selected for the compressible part of the clamping body, it is therefore possible to anchor tendons which extend through the clamping body in the axial direction, in practically any desired distribution, with uniform security. Sometimes one single clamping element may be sufficient in this arrangement, but it is also possible to use two or more clamping elements, preferably in radially symmetrical arrangement.

If the tendons are seated in slotted clamping sleeves of steel or another "hard" material—as in the case of a further improvement of the device of the invention—safe anchoring of the tendons is ensured even when the compression body consists of a relatively "soft" material, as in this case the clamping sleeves surrounding the tendons perform the function of transmitting the forces into the anchorage pot and the concrete surrounding the latter.

According to another embodiment of the device of the invention, the sectors of the individual clamping sleeves are rigidly connected with each other at one end, and preferably at the entry side of the tendons. In this manner, the following essential advantages are achieved:

1. Any sudden increase of the transverse compression at the entry point is avoided. The maximum value of the transverse compression is reached only at the end of a finite length—viewed from the entry point. Due to the fact that the increase of the transverse pressure is thus distributed over a section of the length of the tendons—although this section may be relatively short—the tendons are "protected" at the points where otherwise the maximum stress would be encountered, a fact which influences favourably the long-time rupture strength obtainable.
2. The fact that the clamping sleeves are united at one end and, thus, combined to a block simplifies considerably the handling of the device during assembly, in particular when a greater number of tendons is used.

According to one embodiment of the device of the invention the tendons are surrounded by a clamping body consisting of a material of a strength sufficiently high for transmitting the forces in the longitudinal direction, and the clamping body is surrounded over at least part of its outer surface by a compression body that can be expanded by compression.

This embodiment includes a design of the clamping body especially suited for the space-saving arrangement of several tendons. The block-shaped clamping body provided for this purpose may, depending on the material, be made on the site, for instance poured from an epoxy resin material, which may if necessary be reinforced by suitable filling and/or fibre materials. Or else it may be made from a metal block into which slots are sawn, beginning at the end face on the outlet side and extending preferably in vertical relation to each other, and intersecting in the axes of longitudinal bores receiving the tendons. A clamping body of this type is suited also for such embodiments of the device of the invention in which mutually interlocked wedge plates or the like are used as force-transmitting means.

In a further improvement of the invention, covering films are provided for the tendons which avoid with great security that the surface roughness of the tendons which is required to give them the desired pre-stress in the pre-stressing mould, may lead to peak loads and, thus, possible breakage of the bars when the device of the invention is used for obtaining or maintaining the pre-stress of the bars. Of course, the covering films are needed only when hard clamping bodies or clamping sleeves are used. As an alternative, it is also possible to provide the tendons and/or the clamping sleeves with elastic coatings.

The device of the invention is in principle also suited for pre-stressing in the pre-stressing mould because here, too, effective anchoring of the tendons is necessary for a longer period. Further, the device of the invention is also suited for the end-anchorage of bars used for instance for bracing transmitting masts, tent roofs and similar structures.

It goes without saying that instead of the wedge arrangements used in individual embodiments of the device of the invention within the frame of their force-transmitting means, compression bodies that can be deformed by axial compression may be used in other embodiments.

Starting from a device of the type described at the outset, comprising an internally conical anchorage pot whose inner cross-section tapers towards the entry side of the tendon, and a clamping body arranged within the anchorage pot, in direct contact with the tendon and bearing radially against the conical internal surface of the anchorage pot, which clamping body is axially displaced towards the pre-stressed concrete component under the action of the pre-stress imparted to the tendon and, as a result of this displacement, transmits to the tendon the transverse pressure required for its frictional anchorage, the underlying problem of the invention is solved in accordance with a further embodiment of the invention by an arrangement in which the threshold member takes the form of stop means which limits the axial displacement of the clamping body to an amount linked with a defined transverse pressure sufficient to give the necessary static friction between the clamping body and the tendon or tendons extending through the latter.

This gives at least the following advantages:

The above-described limitation of the displacement path permitted for the clamping body in the anchorage pot, which for safety reasons is conveniently selected to ensure that the obtained transverse compression of the clamping body and the GC tendons is a little greater than a minimum value absolutely necessary to ensure safe anchoring, avoids in a very simple manner that the full amount of the tensional forces applied by the tendons is transformed into excessive compression which would merely impair the breaking strength of the tendons.

It is possible to select very flat gradients for the conical inner wall of the anchorage pot in relation to its longitudinal axis and correspondingly small wedge or cone angles for the clamping body, so that the dimensions of the device of the invention in the crosswise direction remain favourably small even when designed for very high stresses which may for instance be applied to the anchorage pot by several individual tendons. The utilization of small gradients of approx. 2°–5° for the inner cone of the anchorage pot and correspondingly small wedge ratios or cone angles in the range of approx. 1:30 for the clamping body offers the advantage that the transverse pressure is very uniformly distributed over the anchoring length of the tendons.

In addition, small angles and the resulting increase of the displacement of the clamping body in relation to the anchoring pot which gives the desired minimum amount of transverse compression of the clamping body and the tendons, permit the very exact pre-determination and control of the value of this displacement by means of the stop means.

Moreover, the small gradient of the inner cone eliminates practically the described disadvantages connected with the shrinkage of the poured body.

According to a further improvement of the device of the invention, the anchorage pot is closed by a plate at the side of the tendon entry and a buffer body is provided on the inner side of the plate for supporting the clamping body in the axial direction.

The displacement of the buffer body permitted by the latter and required for achieving the frictional fixation is determined on the basis of an empirical value obtained from experiments or calculated on the basis of the design data of the device and the characteristics of the material of the clamping body. It goes without saying that the buffer body and the abutment plate of the anchorage pot must be provided with aligned passage openings for the GC tendons.

According to the invention, the buffer body takes the form of a plate of rigid expanded plastic which can be compressed by the pre-determined displacement of the clamping body under the tensional force acting upon the clamping body. This design distinguishes itself by particular simplicity. However, it is also possible to give the buffer body the form of a steel plate slidably guided in a cylindrical end portion of the anchorage pot, the said steel plate being supported via a resilient member by the abutment plate which closes the anchorage pot at the inlet side and which is firmly connected with the latter.

A particularly advantageous embodiment of the device of the invention permits the length of displacement of the clamping body surrounding the tendons in the anchorage pot to be exactly adjusted to the value necessary for achieving the most favourable transverse compression. To this end a stop plate limiting the displacement may from the very beginning be fixed at a distance from the stop face of the anchorage pot corresponding to the intended length of displacement of the clamping body. However, an individual adjustment of the displacement depending on the applied forces is also possible. To this end, the tensional force at the jack is reduced, with the jack still applied and the clamping bodies ready for being drawn in, by the differential value to be absorbed by the anchorage pot, duly allowing for the intended displacement of the clamping bodies, so that the clamping body will be drawn in only by an amount corresponding to this differential value of the longitudinally acting tensional force, whereupon the stop plate is fixed in its position in which it prevents any further displacement of the clamping body.

In a further improvement of the device of the invention, the tightening nut of one tie rod beares against the stop plate via a resilient member, whose elastic force at approx. half of its maximum elongation corresponds to the tensional force to be absorbed.

In this case, the clamping body can be displaced by a length which is limited by the residual elongation of a partly biased resilient element, in the direction of the attacking longitudinally directed tensional force, after the stop member has been fixed in its stop position. In this manner, the minimum transverse pressure required for fixing the tendons in the clamping body can be maintained even when the volume of the clamping body is subsequently reduced by shrinkage or inelastic deformation, facts which would otherwise lead to a reduction of the transverse compression. This embodiment of the device of the invention is particularly suited for poured anchoring systems.

In a further improvement of the device of the invention which gives a favourably uniform distribution of the transverse compression of the clamping body over the full anchoring length of the tendons, the tendons to be anchored are retained in the poured body which takes the form of a truncated cone, by means of clamping sleeves which extend through the latter in the longitudinal direction and can be radially compressed. The said clamping sleeves are provided with radial flange portions bearing against the outer face of a pressure plate which can be moved in the axial direction and which is in direct contact with the base surface of the poured body facing the outlet side, and which covers the whole area of the said base, except for a peripheral gap required for its axial displacement.

In this embodiment of the device of the invention, the tensional forces acting via the tendons are introduced into the clamping body which as a result of its permanent elasticity is subjected to an axial compression which produces a quasi-hydrostatic interior pressure in the clamping body and favours the uniform distribution of the transverse pressure over the whole anchoring length. If the material of the poured body is suitably selected, i.e. if its mechanical properties are suitably predetermined, the translation ratio for the transformation of the load-responsive tensional forces into proportional transverse pressures can be varied within very broad limits and adjusted to the desired value. In particular, this embodiment of the device of the invention makes it possible to avoid the formation of a peripheral gap at the outlet side of the tendons, as a result of shrinkage in the poured body, as such a peripheral gap would make the relevant area ineffective for the anchorage of the tendons.

According to a further improvement of the device of the invention, clamping sleeves are provided which have their shell subdivided by radially extending longitudinal slots into preferably axially symmetric sectors ending in an undivided end portion in the form of a block or tube. This arrangement prevents effectively sudden increases of the transverse pressures at the entry point. Rather, the maximum value of the transverse pressure is obtained only at the end of a finite length, viewed from the point of entry of the tendons into the device. The fact that the increase of the compression forces is distributed over a certain—if only short—length of the tendons "protects" the tendons at the point where in the known poured anchoring systems the maximum stress is exerted upon the tendons, a fact which has a favourable influence on the achievable long-time rupture strength. In addition, handling of the device during assembly is considerably facilitated, in particular when the greater number of clamping sleeves is combined within a block which is undivided on its entry side. An advantageous further improvement of the device of the invention which is particularly suited for a space-saving central arrangement of the tendons can be realized by an arrangement in which the clamping sleeves are combined to a block-shaped clamping sleeve body to which the necessary resilience vertically to the extension of the tendons necessary for the transmission of the transverse pressure is imparted by longitudinal slots the longitudinal centre planes of which intersect in the axes of the tendons. In a further improvement of the device of the invention, an effective limitation of the transverse forces acting upon the tendons to be anchored is achieved by a design of the clamping means and/or the translating means for transforming longitudinal into transverse forces which permits the adjustment or defined pre-selection of very small translation ratios.

According to one embodiment of the device of the invention, this purpose is achieved by an arrangement in which at least part of the clamping body takes the form of a body that can be compressed, for instance by wedge action, by the tensional forces applied via the tendons in the axial direction and into which additional supporting members and/or unstrained members, whose mechanical properties and dimensions correspond to those of the tendons, can be inserted and fixed in the clamping body in a manner analogous to that of the tendons, in addition to those tendons which under load transmit the transverse forces obtained by translation of the tensional forces.

By this arrangement of the device of the invention, at least the following advantageous functional properties are achieved:

By suitably selecting the dimensions and material properties of the compressible part of the clamping body, the increase of the load-responsive transverse pressures acting upon the tendons can be adjusted to a defined value which may vary within broad limits, and can, thus, be limited to the amount permissible under the particular circumstances. Further, the arrangement of the device of the invention in which the—load-dependent—tensional forces acting upon the tendons are introduced via the axially displaceable compression plate arranged at the outlet side, effects in the most simple manner the re-stressing of the clamping body necessary for the safe anchorage of the tendons, and that under all conceivable circumstances.

The pre-selection of the number and dimensions of the additional supporting members which take up part of the transverse pressures resulting from the tensional forces acting upon the tendons, and practically absorb such transverse pressures, the increase of the load-dependent transverse pressure to which the tendons are subjected can be adjusted to a defined value that may vary within broad limits and, thus, restricted in a very simple manner to the amount permissible under the given circumstances.

It is true that in the case of the known wedge anchoring systems or poured anchoring systems it is also possible to vary the ratio between the transverse pressure and the tensional forces by a suitable selection of the relevant wedge angle, but in these cases the variation range is limited by the fact that the wedge angle must be smaller than the critical angle beyond which no gliding will be possible. As a result thereof, the ratio between the transverse forces and the tensional forces cannot be reduced below a given minimum. In contrast, the device of the invention offers the advantage that there do not exist such limitations and that, if necessary, very small translation ratios between the transverse and the tensional forces can be realized.

In a further embodiment of the device of the invention, the effective translation ratio between the transverse and the tensional forces can be pre-determined in a simple manner by the numerical ratio between the tendons anchored in the one wedge-shaped portion of the clamping body and the tendons anchored in another portion of the clamping body. It goes without saying that even in the case of a two-part design of the clamping body, this translation ratio can be influenced by the additional arrangement of unstrained bars in the wedge-shaped portion of the clamping body, in addition to the tendons through which the tensional forces are applied. When individual tendons are replaced by such unstrained members, the tendons actively contributing to the introduction of the tensional forces should be conveniently given a radially symmetric or mirror symmetric arrangement, which means that the symmetry of the distribution of these tendons should correspond to the symmetry of distribution of the total tendons.

According to a further improvement of the device of the invention it is convenient to provide an uneven number of tendons arranged along a common plane and retained between the flat wedges of the wedge-shaped portion of the clamping body, so that when individual tendons are replaced by unstrained members an arrangement can be realized in which for instance each unstrained member is arranged between two tendons actively contributing to the transmission of the transverse forces, so as to introduce the forces into the end-anchoring device as uniformly as possible.

A compensating layer provided according to the invention offers the advantage that a uniform distribution of the transverse pressure along the anchoring length of the tendons which are retained between hard clamping body elements that are in turn movable in the crosswise direction, is sufficiently ensured even when the walls of a recess provided in the concrete component and providing the lateral support to the clamping body or the walls of an anchorage pot receiving the clamping body do not extend exactly in parallel to the corresponding supporting faces of the clamping body.

As a rule, such a compensation layer will be necessary only when the clamping body is inserted into a recess in the concrete component. In this case, the compensating layer will conveniently take the form of an inner lining of the said recess and will in particular serve the purpose to equalize the surface roughness and possible production tolerances of the recess.

A resilient adhesive layer into which the tendons are embedded provided in accordance with the invention offers the advantage that peak pressures resulting from the superficial roughness of the tendons themselves and/or the clamping body elements which could lead to clearly excessive values of the transverse pressures exerted upon the tendons, can be largely prevented. In contrast, a superficial roughness provided intentionally on the clamping body elements can be advantageously utilized for achieving improved adherence of the tendons in the clamping body and, thus, for reducing the minimum transverse pressures required to achieve a safe fixation of the tendons. The adhesive layer between the tendons and the clamping body elements, which may be practically realized in the form of a coating applied either to the tendons themselves or to the clamping body elements, should however not be excessively thick so as to keep the displacements which the wedge member must perform to reach the necessary minimum transverse pressure within reasonable limits. Therefore, the coating thickness should conveniently be only little greater than the superficial roughness of the tendons or the clamping body elements that can be expressed as the difference in diameters or distances.

In a further improvement of the device of the invention, a defined limitation of the load-dependent contribution to the transverse pressures is achieved by a suitable selection of the numerical ratio between the tendons which are anchored in an externally conical, axially displacable part of the clamping body and those tendons which are anchored in a central part of the clamping body forming a fixed core in the anchorage pot upon which the outer poured part of the clamping body is permitted to slide. In this embodiment, the device of the invention is largely analogous to a poured-cone anchoring system, with the exception that the core may also consist of a different material and may also be composed of metal clamping plates acting upon each other via the tendons. In this case, the gaps remaining between the plates should be covered by a suitable sheathing to prevent the penetration of the grouting compound into the core of the clamping body.

According to still another embodiment of the device of the invention, the clamping body takes the form of a body filling the complete anchorage pot and consisting of a material expandible under compression, that the at least one tendon is held in a clamping sleeve enclosed by the compression body and extending through the latter, that radial flange portions of the said clamping sleeve bear upon the outer face of a compression plate which can be displaced in the longitudinal direction of the tendons and which, except for a small peripheral gap, closes the full anchorage pot on the side of the tendon outlet, and that tensioning means are provided for giving the clamping body the initial compression necessary to achieve the frictional fixation of the tendon under service load, by axial displacement of the compression plate.

According to a further improvement of the device of the invention, a cylindrical pot-shaped hollow anchorage body is provided which limits the anchorage space in the radial direction and on the entry side of the at least one tendon, which is supported on the concrete component against the action of the tensional forces applied through the tendon, and which is closed on the entry side of the tendon by means of a bottom plate rigidly connected with the shell of the hollow body and provided with a passage opening for the clamping sleeve. In this case, it is much easier to give the anchorage cavity a defined shape and defined surface properties of its inner walls than in the case where the anchorage cavity is defined by the concrete component itself.

This applies in particular to a further embodiment of the invention in which a portion of the entry side of the anchorage pot corresponding to approximately 1/10-1/5 of the total length of the device exhibits a markedly larger inner diameter (approx. 1.5 to 3 times larger) than the portion at the entry side delimited by the bottom plate.

In such cases, the recess in the concrete component receiving the anchorage body may have a simple shape which renders formwork easier. Any clearances remaining between the anchorage pot and the walls of the recess in the concrete component may be grouted after application of the device in order to retain the anchorage pot securely in its intended position.

Figure 1:
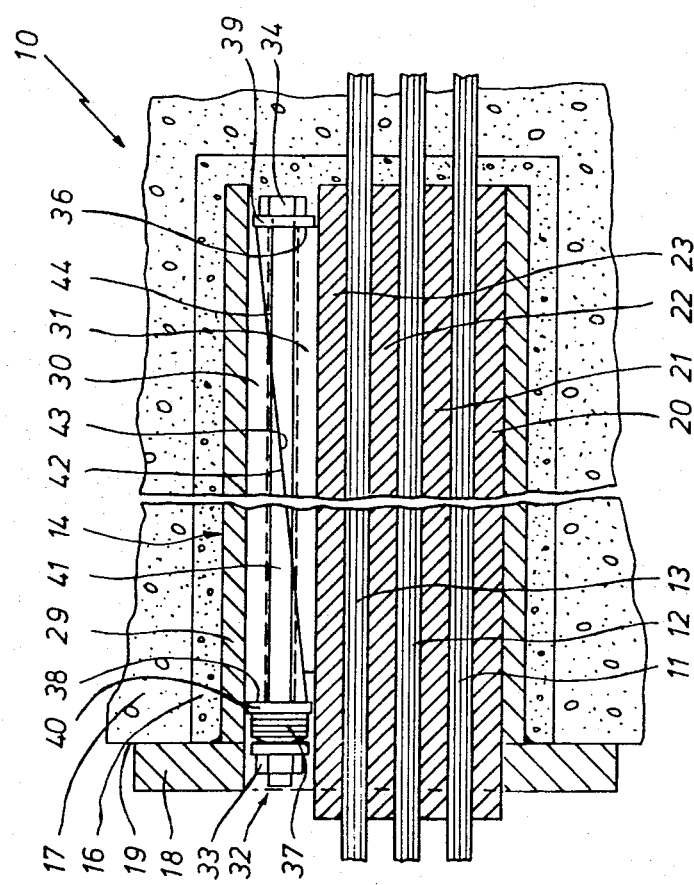
Figure 4:
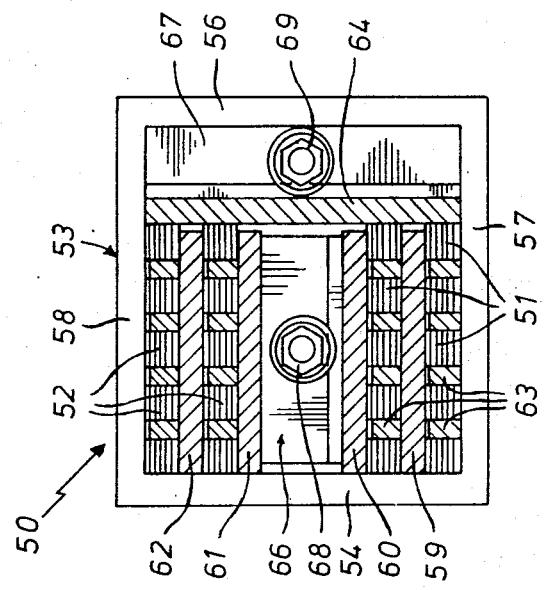
Figure 2:
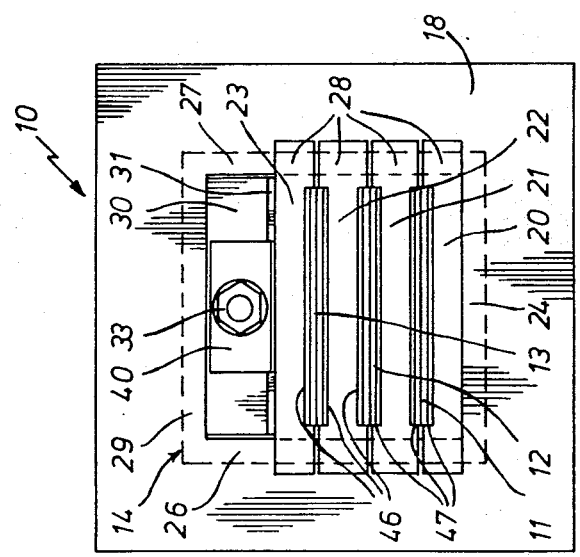
Figure 5B:
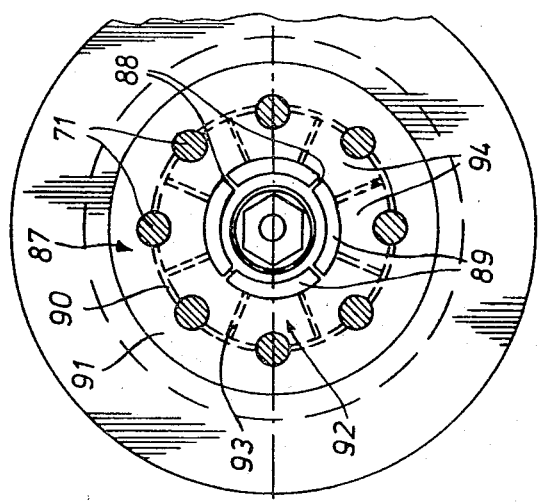
Figure 5A:
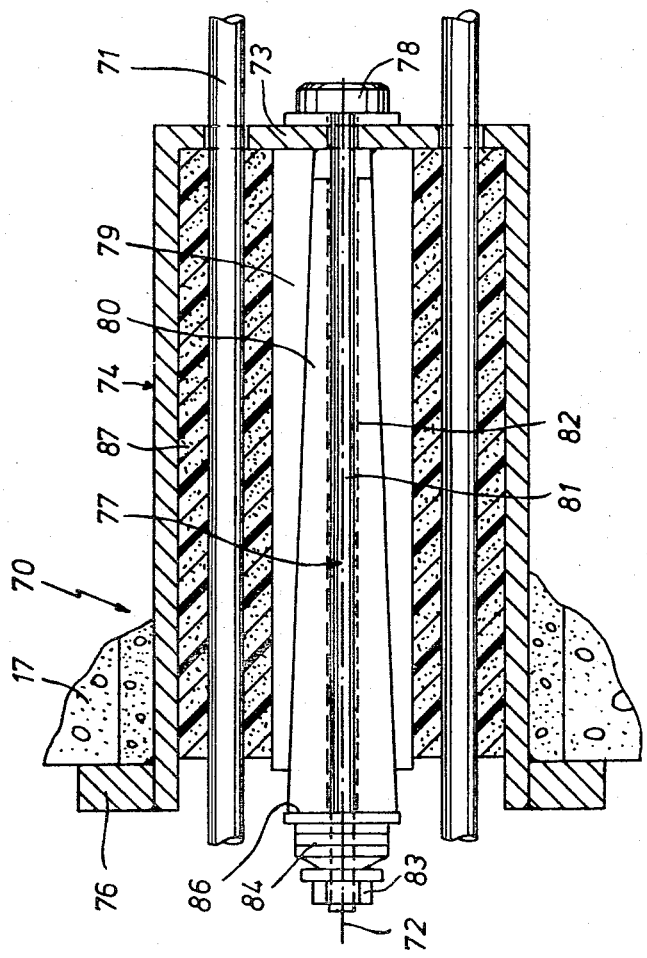
Figure 8A:
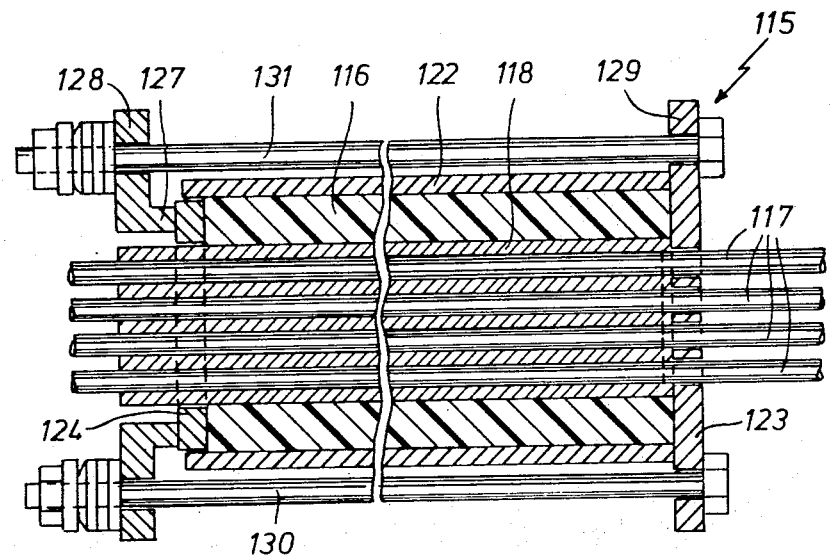
Figure 8B:
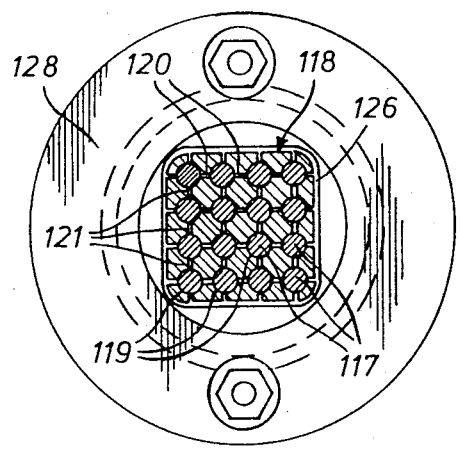
Figure 9:
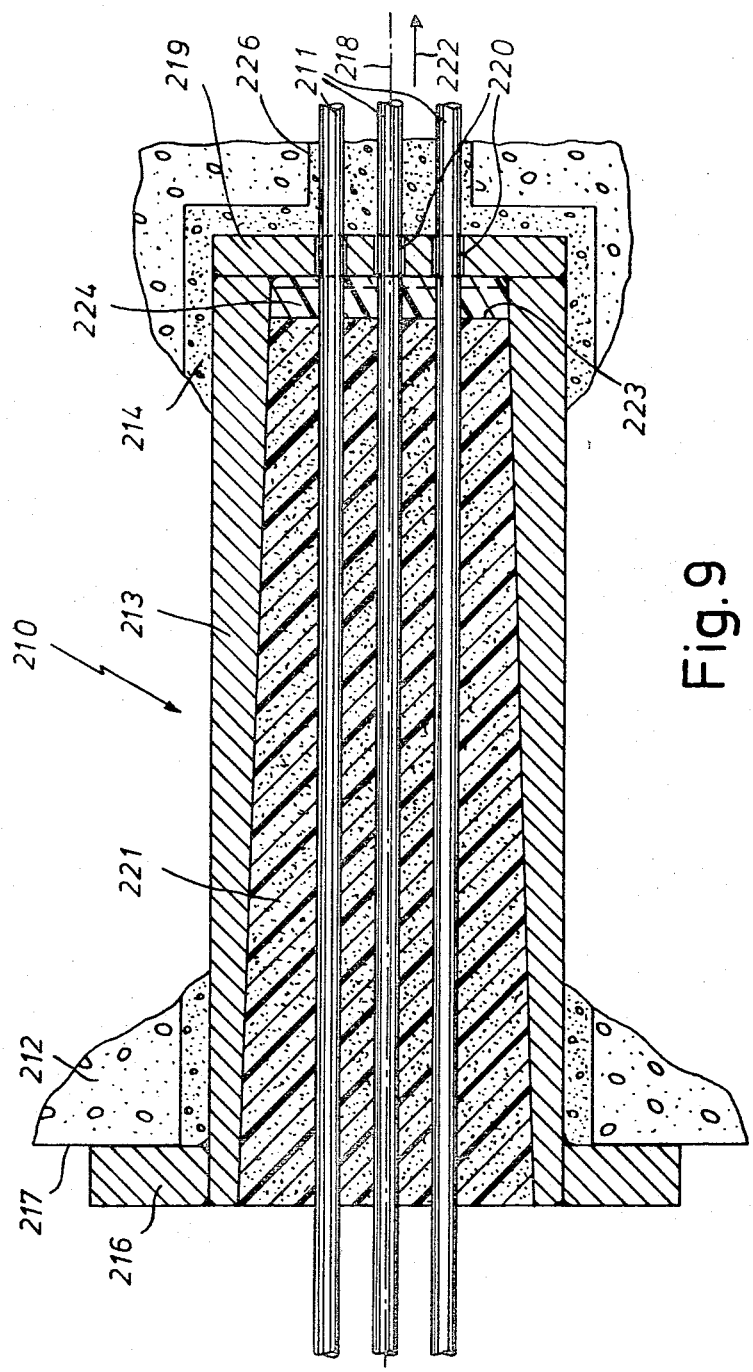
Figure 10:
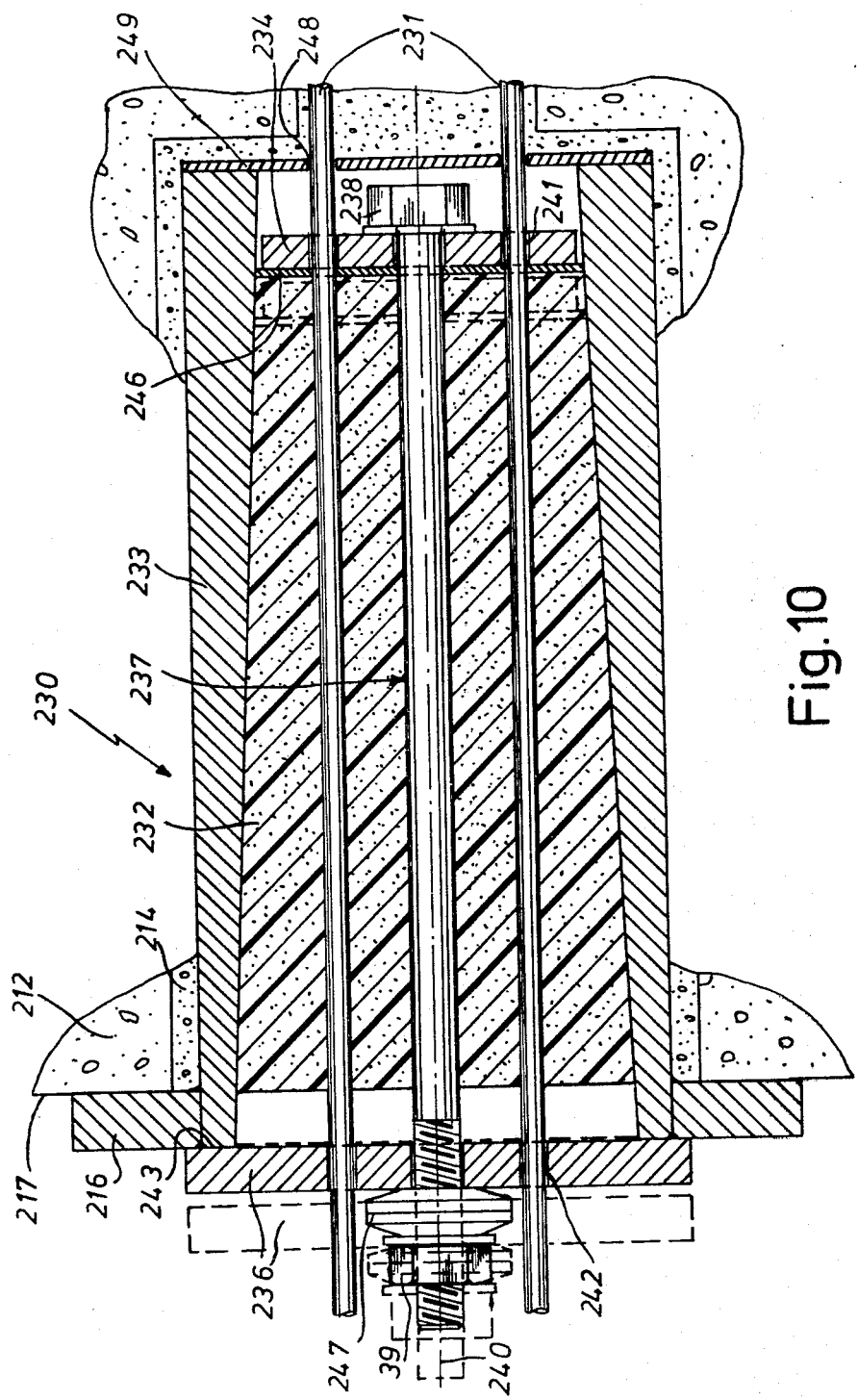
Figure 11:
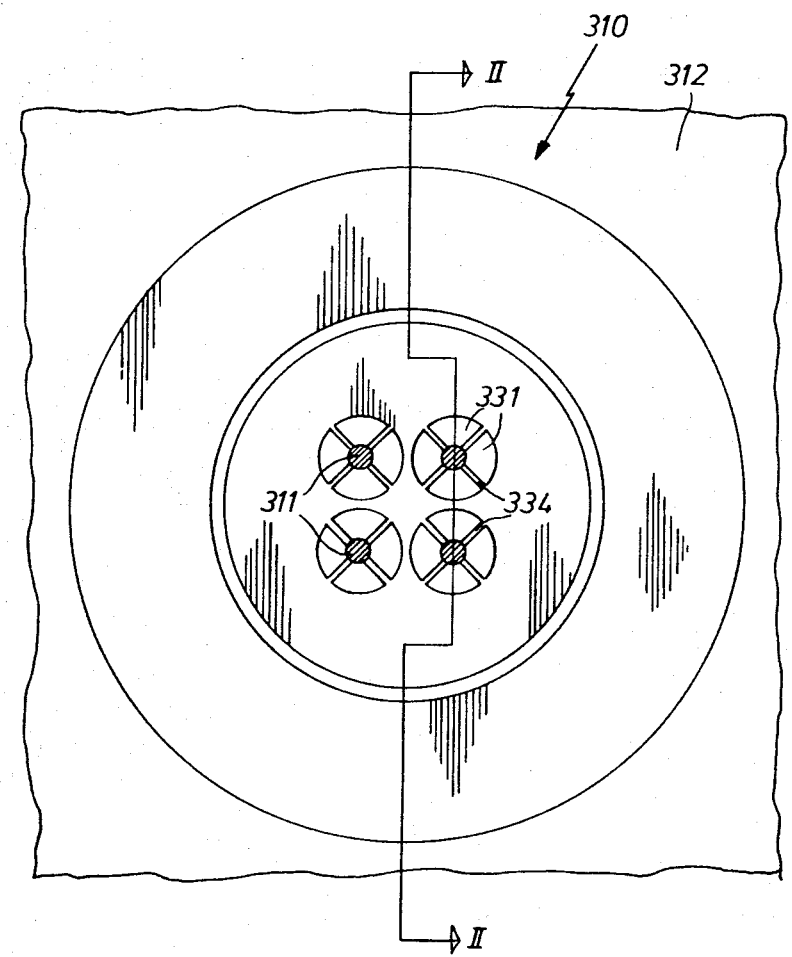
Figure 12:
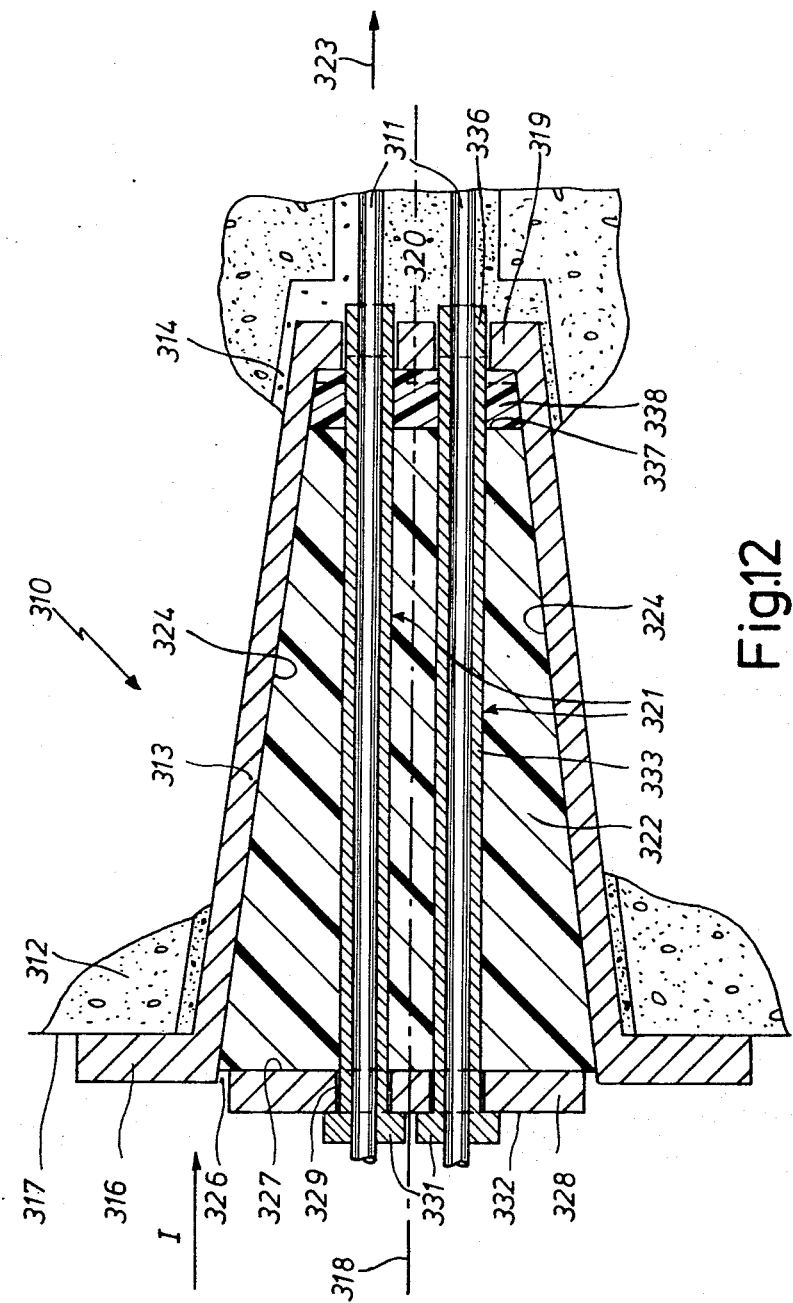
Figures 13, 14:
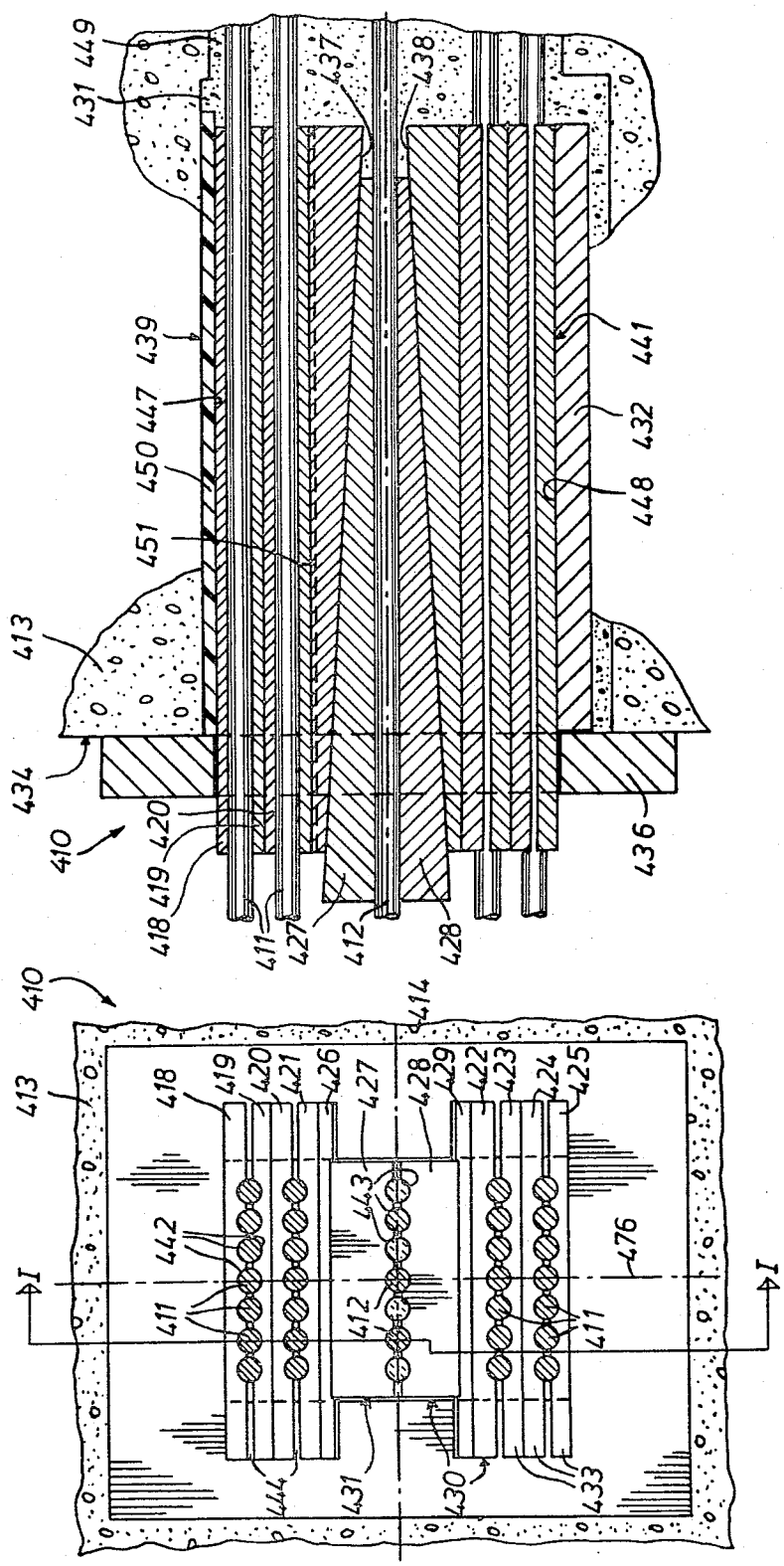
Figure 15:
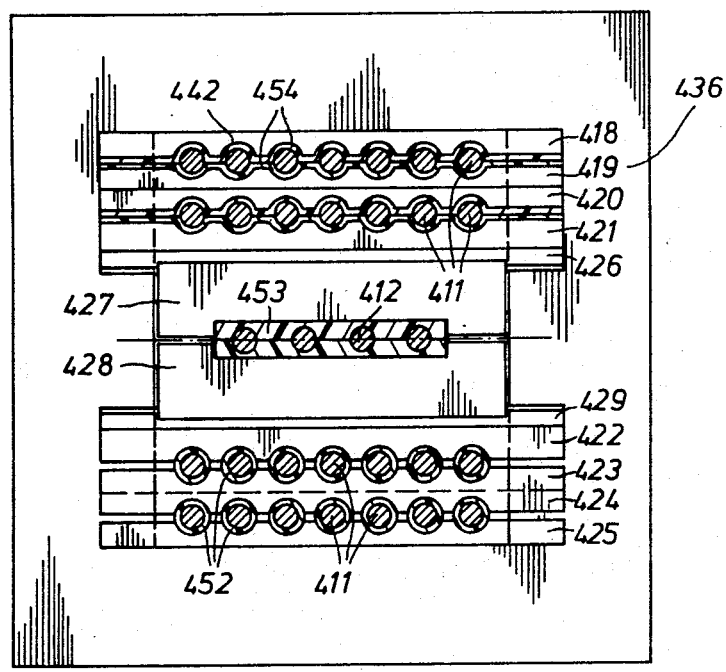
Figure 16:
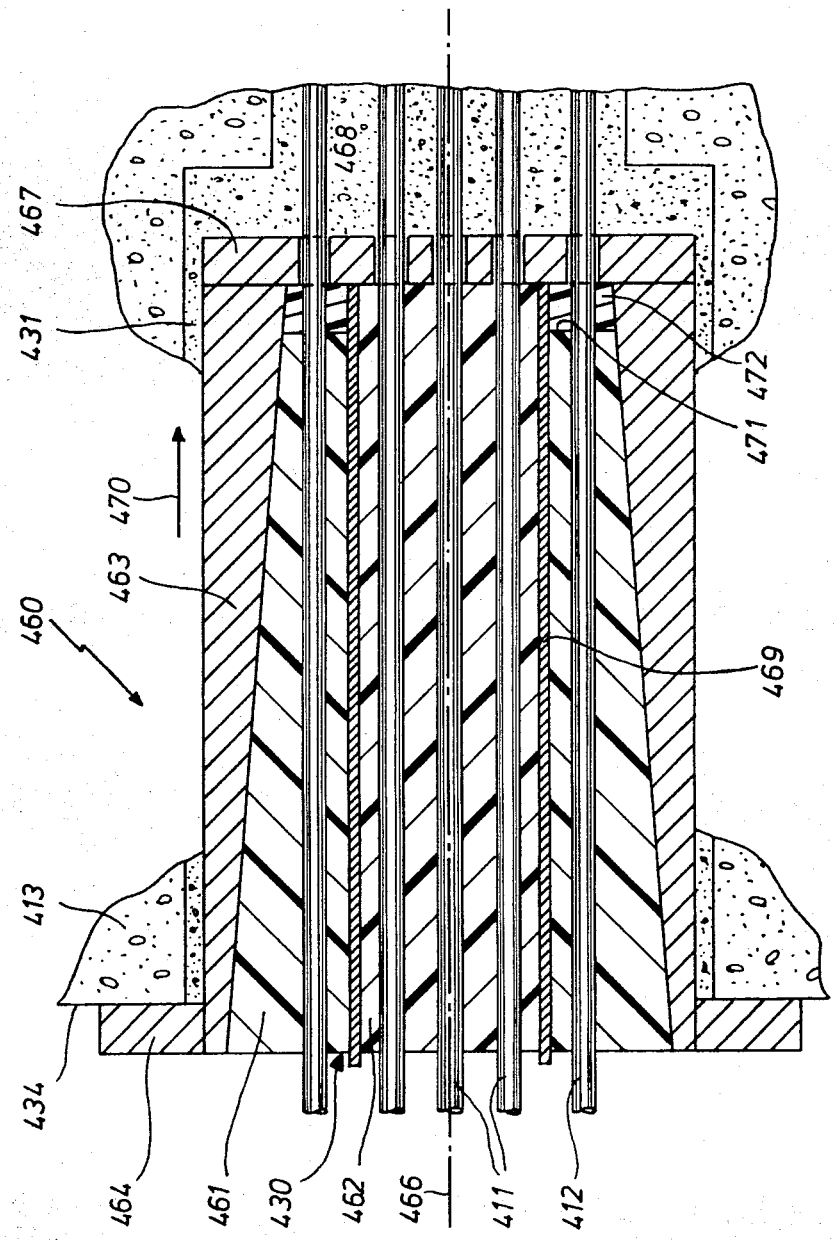
Figure 18:
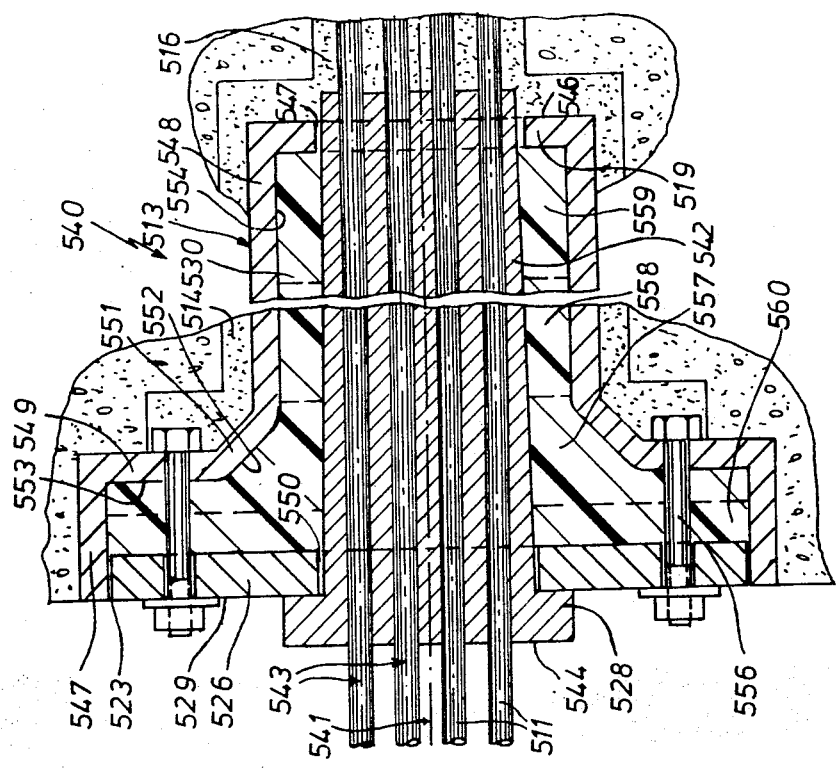
Figure 17:
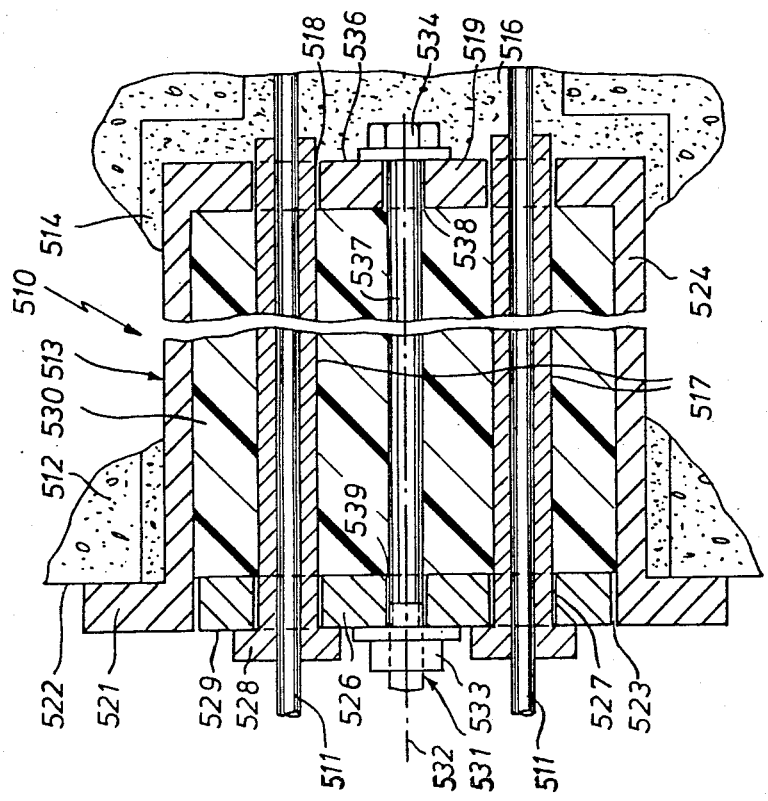

Further improvements and characteristics of the invention will be apparent from the following description of examples when read with reference to the drawing in which:

FIG. 1 shows a first embodiment of a device in accordance with the invention which is particularly well suited to providing end-anchorage for tendons in the form of flat bars and which incorporates force transmitting means using mutually interlockable wedge plates and clamping plates supported externally on the tendon outlet side in a section taken along the vertical longitudinal central plane of the device, FIG. 2 shows the device of FIG. 1 as viewed from the tendon outlet side, FIG. 3 shows the entry-side end portion of a second embodiment of a device in accordance with the invention largely analogous in design to the device of FIG. 1 with the clamping plates supported at the entry side in a broken-off section corresponding to the representation of FIG. 1, FIG. 4 shows a third embodiment of a device in accordance with the invention wherein the transverse forces are introduced along two different axes, in a representation corresponding to that of FIG. 2, FIG. 5a shows a device in accordance with the invention wherein the transverse forces are applied radially with the aid of force translating means in the form of a cone/taper wedge arrangement in a section corresponding to the representation of FIG. 1, FIG. 5b is a view of the device in accordance with FIG. 5a in a representation corresponding to that of FIG. 2, FIG. 6a shows a preferred embodiment of a device in accordance with the invention with a clamping body which may be radially expanded by axial compression, in an interrupted representation, partially broken away, corresponding to that of FIG. 5a and drawn to a scale of about 1:1, FIG. 6b is a view of the device in accordance with FIG. 6a in a representation corresponding to that of FIG. 5b, FIGS. 7a–8b show two further preferred embodiments of devices in accordance with the invention provided with compression bodies which serve to transmit the forces, in representations corresponding to those of FIGS. 6a and 6b respectively, FIG. 9 shows a further embodiment of a device in accordance with the invention as a longitudinal section drawn to a scale of 1:1.5, FIG. 10 shows a further embodiment of a device in accordance with the invention represented as a section corresponding to that of FIG. 9, also drawn to a scale of 1:1.5, FIG. 11 is a view of a device in accordance with the invention in the direction indicated by the arrow I of FIG. 12, FIG. 12 shows a section through the end-anchoring device of FIG. 11 taken along the line II—II, FIGS. 11 and 12 are each drawn to a scale of approx. 1:2, FIG. 13 shows a special embodiment of an end-anchoring device in accordance with the invention for tendons in the form of round bars made from a fibrous compound material and with force-translating means using mutually interlocked flat wedges and clamping plates in a section taken along line I—I of FIG. 2, FIG. 14 shows the device of FIG. 13 as viewed from the outlet side of the tendons, FIG. 15 shows a special modification of the device shown in FIGS. 13 and 14 in a representation corresponding to that of FIG. 14 and FIG. 16 shows a further special embodiment of an end-anchoring device in accordance with the invention with a clamping body taking the form of a poured part generally shaped like a truncated cone, FIGS. 13–16 are each drawn to a scale of approx. 1:2, FIG. 17 shows a longitudinal section, partially broken away, through a further embodiment of an end-anchoring device in accordance with the invention, and FIG. 18 shows still another embodiment of the device in accordance with the invention in a representation corresponding to that of FIG. 17, each drawn to a scale of approx. 1:1.5 to 1:2.

In the following, the anchoring devices shown in FIGS. 1–18 will be explained with special reference to their use as permanent end-anchoring systems for tendons made from fibrous compound materials in pre-stressed concrete structures, although, in conjunction with conventional jacks for example, these devices may also be used as movable tensioning heads which are required to retain the tendon ends for a relatively short time only in order to adjust the necessary pre-stress. Further possible applications involving a permanent or temporary anchorage of tendons in general will be readily apparent to those skilled in the art from the design and functional details of the various embodiments shown by way of example which will now be discussed.

FIGS. 1 and 2 show an end-anchoring device 10 in accordance with the invention for, in this case, three flat-bar tendons 11–13 made from a fibrous compound material disposed in parallel, vertically spaced arrangement above each other. These tendons are enclosed in an anchorage pot 14 of the device 10 taking the form of a 4×4 cm$^2$ square hollow steel section through which they extend longitudinally.

The anchorage pot 14 is received in a cylindrical, outwardly open recess 16 of the concrete body 17 and supported on the external surface 19 of the concrete body 17 surrounding the opening of the recess 16 by means of a flange 18 provided at the outer end of the anchorage pot. The remaining cavity between the anchorage pot 14 and the walls of the recess 16 is grouted under pressure with concrete or some other suitable jointing compound.

Inside the anchorage pot, the tendons 11–13 are disposed between clamping plates 20–23 of steel or aluminum whose effective thickness corresponds to their vertical spacing—at least where these clamping plates are disposed between the tendons 11–13—and whose width is slightly smaller than the inside width of the anchorage pot 14. The embodiment discussed here by way of example has a total of four clamping plates 20–23 which, together with the tendons 11–13, form a sandwich-like stack, such that each tendon is disposed between two clamping plates, this stack being supported at the lower transverse leg 24 of the anchorage pot 14 via its lowermost clamping plate 20 according to the arrangement shown in FIG. 2. At their end portions protruding from the anchorage pot 14, the clamping plates 20–23 have laterally projecting flange pieces 28, approximately hammerhead-shaped in cross-section, which cross the vertical leges 26 and 27 of the anchorage pot 14 as shown in FIG. 2 and which directly contact the outer end faces of the legs 26 and 27 and prevent the clamping plates 20–23 from being pulled out of the anchorage pot 14 in the direction of the tensional force acting on the tendons 11–13.

Between the clamping plate 23 shown uppermost in FIG. 3 and the upper transverse leg 29 of the anchorage pot 14, the arrangement shown in FIGS. 1 and 2, to which reference should be made for details, features two wedge plates 30 and 31 which are slidably guided between the vertical legs 26 and 27 in the longitudinal direction of the anchorage pot 14 and which may be mutually interlocked by means of a clamping element 32 enabling a pre-stress of a defined amount acting in the longitudinal direction of the anchorage pot to be adjusted and to be kept constant to a very large extent.

The clamping element 32 takes the form of a conventional tie rod which may be tensioned by means of an externally disposed tightening nut 33 and whose head 34 bears against the back 36 of the one wedge plate 31 disposed in the region of the inner end of the anchorage pot 14 facing towards the concrete while its tightening nut 33 bears against the back 38 of the other wedge plate disposed at the outlet end of the tendons 11–13 and the clamping plates 20–23, i.e. the end facing toward the outside, via one or more cup springs 37 and, if necessary, spacers 39 and 40. The shaft 41 of the tie rod 32, which takes the form of a round steel bar, extends in a central channel formed by longitudinal grooves in the wedge faces 43 and 44 of the wedge plates 30 and 31 bearing against each other.

The axial clamping force exerted by the clamping element 32, whose amount can be predetermined very accurately by the pre-stress of the cup springs 37, is transformed into a transverse pressure acting on the stack composed of clamping plates and tendons by the wedge plates 30 and 31. This transverse pressure is uniformly distributed over the area of the tendons 11–13. A clamping length of approx. 25 cm and a transverse pressure of approx. 30–35 N/mm$^2$—a value readily obtainable with the clamping element 32 and the wedge plate arrangement 30, 31 acting as force transmitting and translating means—are required to achieve frictional anchorage of the tendons 11–13 between the clamping plates 20–23 and, through these, to the anchorage pot 14. In order to prevent the tendons made from fibrous compound material from separating into fibres starting, in particular, at their longitudinal edges when these tendons are subjected to load and transverse pressure, the tendons 11–13 are very accurately fitted into flat longitudinal grooves 46 of the clamping plates 20–23 so that the tendons 11–13 are enclosed by the clamping plates 20–23 also on the greater part of their narrow longitudinally extending surfaces. FIG. 3 shows a modification of the device 10 of FIG. 1 inasmuch as the inner end of the anchorage pot 14, i.e. the end where the tendons 11–13 enter the pot, is closed by means of a welded-on bottom plate 47 which directly bears against the concrete body 17 and the inner surface of which now supports the clamping plates 20–23. In this modification, the tensile load is applied to the concrete body 17 substantially via the bottom plate 47, in contrast to what occurs in the device 10 of FIG. 1 where the load is substantially supported via the flange 18. Consequently, a device designed as shown in FIG. 3 does not require the clamping plates to be provided with flange pieces 28 on the outside. A practical arrangement of the passage openings 48 provided in the bottom plate 47 is one in which the inside width and height of these openings are slightly larger than the width and thickness of the tendons 11–13 so that these cannot be damaged when the stack composed of clamping plates and tendons is compressed. The arrangement of the wedge plates 30 and 31 and the clamping element 32 may be the same as for the device of FIG. 1, but it is also possible to support the head 34 of the clamping element on the outer surface of the bottom plate 47 facing toward the concrete, as indicated by the broken lines. In this case, a slightly greater depth must be provided for the recess in the concrete body or else an additional small recess 49 must be provided to receive the head 34 as has also been indicated by broken lines.

The arrangement in which the clamping plates 20–23 are supported on the inside of a bottom plate 47 of the anchorage pot 14 as explained with reference to FIG. 3 lends itself to the anchorage of tendons 51 and 52 having a square cross-section of approx. 6×6 mm$^2$, especially when used in conjunction with the end-anchoring device 50 shown in FIG. 4. The anchorage pot 53 is a rectangular hollow section with vertical legs 54 and 56 and horizontal legs 57 and 58, referring to FIG. 4. The tendons 51 and 52 are divided into two groups of 12 tendons each which in the configuration shown in FIG. 4, to which reference should be made for details, are disposed between horizontal clamping plates 59–62, vertical clamping bars 63 and a vertical clamping plate 64 as well as the leg 54 located opposite said clamping plate and the horizontal legs 57 and 58 of the anchorage pot 53. Two wedge plate arrangements 66 and 67 and clamping elements 68 and 69, which act on said wedge plate arrangements and which may be adjusted to a defined pre-stress, are provided to produce the clamping forces required for frictional anchorage of the tendons 51 and 52. In design and arrangement, these wedge plate arrangements and clamping elements are completely analogous to the wedge plate arrangement 30, 31 and the clamping element 32 of FIGS. 1 and 2. A transverse pressure in the vertical direction is achieved by means of the one wedge plate arrangement 66 supported between the inner horizontal wedge plates 60 and 61, while a transverse pressure applied to the tendons 51 and 52 in the horizontal direction is achieved by means of the other wedge plate arrangement 67 coacting with the vertical clamping plate 64 and the right-hand vertical leg 56 as shown in FIG. 4.

The end-anchoring device 70 of the invention shown in FIGS. 5a and 5b lends itself to anchoring tendons 71 which, in principle, may have any desired cross-sectional shape and, in particular, to anchoring tendons in the form of round bars which are preferably grouped around the longitudinal axis 72 of the device 70 in the radially symmetrical distribution shown. The device 70 has a cylindrical pot-shaped hollow anchorage body 74 which is open at the outlet side of the tendons 71 and closed by means of a bottom plate 73 at their entry side and which, on its outside, is additionally provided with a radial ring flange 76 bearing against the concrete body 17. The clamping element takes the form of a tie rod 77 which extends along the central axis (and which is completely analogous in) 72 design to the clamping element 32 of FIG. 1, except that its head 78 is supported on the outer surface of the bottom plate 73. The design of the force transmitting means 78 is such that it transforms the axial clamping force of the tie rod 77 into radial transverse forces. In the arrangement and design shown in FIGS. 5a and 5b, the force transmitting means 78 comprises an externally cylindrical and internally conical sleeve 79 and a longish wedge body 80 in the form of a truncated cone which is complementary to the internal taper of the sleeve 79 and which has a longitudinal bore 82 enclosing the shaft 81 of the tie rod 77. The tightening nut 83 of the tie rod 78 is supported on the larger base surface 86 of the wedge body 80, again via cup springs 84. The tendons 71 are snugly embedded in a clamping body generally denoted by the numeral 87. Viewed in a cross-section, this clamping body fills the remaining cavity between the anchorage pot 74 and the conical sleeve 79, preferably completely. To ensure the expandibility of the conical sleeve 79, usually made of steel, which is required to apply transverse pressure to the clamping body 87 and the tendons 71, the shell of the sleeve is divided into sectors 89 by means of radially extending longitudinal slots 88. If the clamping body 87, too, consists of a very rigid material, such as steel or aluminum, the clamping body must also be divided by means of longitudinal slots in a manner permitting a uniform transverse pressure to be applied to the tendons 71. This is also necessary if the clamping body 87 consists of a relatively soft material, such as an alloy of lead or aluminum, in order to bring the clamping surfaces into intimate contact with the tendons 71. A suitable arrangement of such slots is indicated by the broken lines in FIG. 5b such that in a cross-sectional view of the clamping body 87 the latter is divided into an outer undivided ring area 91 by means of slots 90 in the shape of circular arcs extending between the longitudinal bores enclosing the tendons 71 and into an inner ring area 92 which, in turn, is divided into sectors 94 assigned to the individual tendons 71 by means of radial slots 93. Alternatively, the clamping body 87 may be one integral part made of a material which is sufficiently deformable radially and still retains sufficient strength to transmit the forces in the longitudinal direction. An example of a suitable material would be an epoxy resin filled with mineral fillers and/or reinforced with steel fibres. The clamping body 87 may then take the form of a poured body, possibly produced on the site where the device 70 is put to use and not poured until the anchorage pot 74 has been brought into its final position, in which it is supported on the concrete 17.

If the clamping body is made of the abovementioned suitably reinforced epoxy resin material or if it consists of an elastomer whose compressive and shear strengths have been increased by means of suitable reinforcements or fillers without substantially reducing its deformability, then the end-anchoring device 95 shown in FIGS. 6a and 6b may be used to anchor the tendons 71 instead of an end-anchoring device in accordance with FIG. 5a,b. In design, the device 95 differs from the device 70 only in that a compression plate 97, which is slidably guided on the anchorage pot 74 in the axial direction and which can be applied to the clamping body 96 from the outside, is provided instead of the conical sleeve 79 and the wedge body 80. The tightening nut 83 of the tie rod 78 is then supported on the compression plate 97 via the cup spring 86. In this case, the clamping body 96, whose compressibility is ensured by selecting a suitable material, cooperates with the tie rod 77 to provide for both transformation of the axial clamping and compression forces of the tie rod 77 into radially acting transverse forces and frictional connection of the tendons 71 to the anchorage pot 74, thus performing both the function of the force transmitting means and the function of the clamping means of the abovementioned embodiments of the invention shown by way of example.

It is an essential advantage of the quasi-hydrostatic pressure distribution in the clamping/compression body 96 achieved by compression that unlike to what happens in the device of FIG. 5a,b, for example, no forces act on the tendons 71 which might cause a radial deflection of said tendons 71.

Figures 7A, 7B:
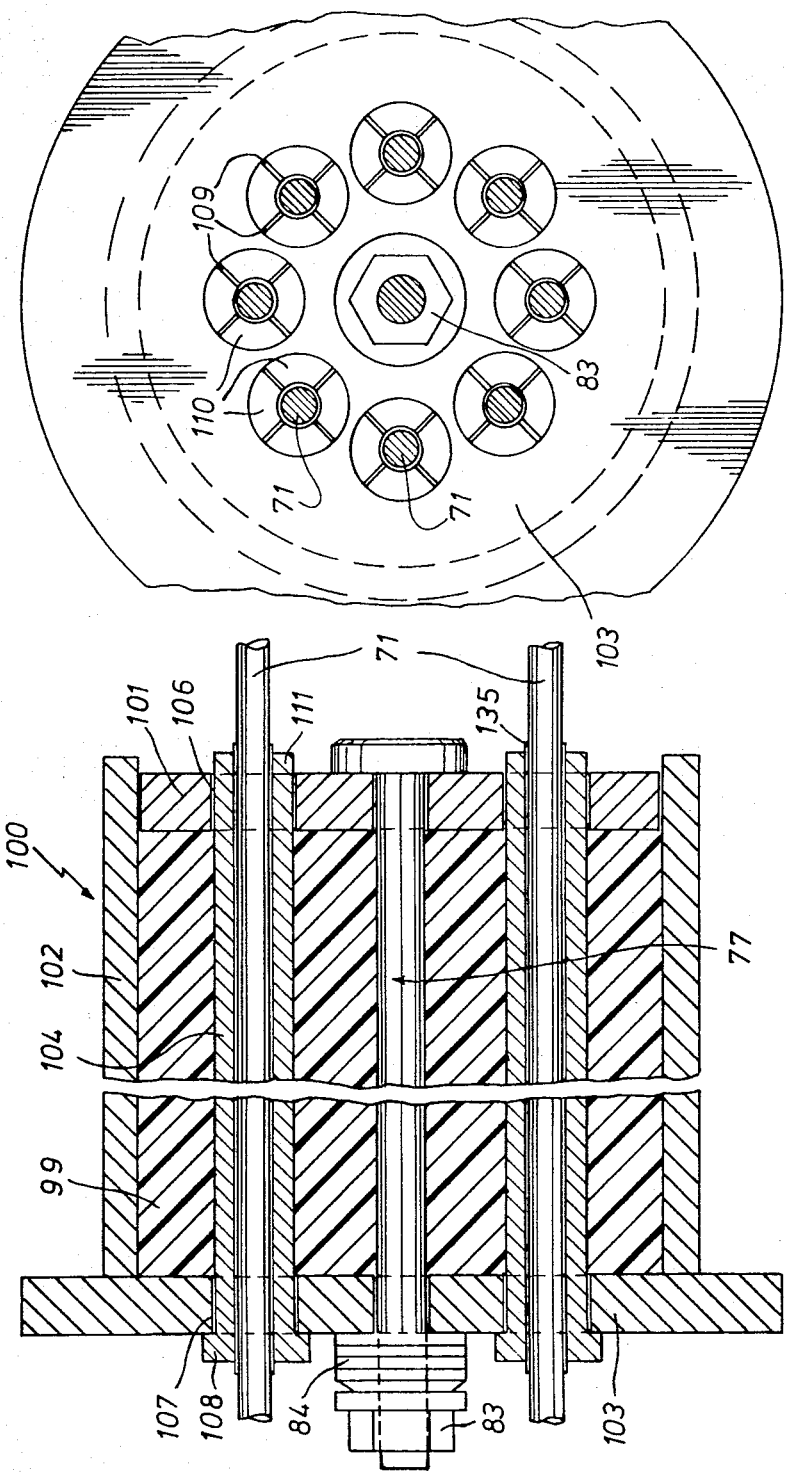

This is also true of the end-anchoring device 100 of the invention shown in FIGS. 7a and 7b whose main difference in comparison with that shown in FIG. 6a,b consists in that an appreciably softer material, such as polychloroprene or sulfochlorinated polyethylene or the like may by used for for the compression body 99, which facilitates both handling of the device 100 and accurate adjustment of the transverse pressure required for frictional anchorage of the tendons 71. A further difference to the device 95 of FIG. 6a,b is that the movable compression plate 101 is disposed at the inner, i.e. entry-side end of the cylindrical anchorage pot 102 and that the latter is closed by a stationary abutment plate 103 at its outer end, on which the tightening nut 83 of the tie rod 77 is supported via the cup spring arrangement 84. Furthermore, the tendons 71 are seated in cylindrical clamping sleeves 104 made of steel or aluminum penetrating through aligned bores 106 and 107 of the compression plate 101 and the abutment plate 103 respectively.

At the outlet-side end, the clamping sleeves have a radially projecting anchor flange 108 which introduces the tensile load into the abutment plate 107 and, thus, into the anchorage pot 102. In order to enable the clamping sleeves 104 to make contact with the tendons 71 under the "hydrostatic" pressure of the compressed material 99 on the full clamping length required and with the necessary transverse pressure, they are divided into sectors 110 by means of radial slots 109 in the manner shown in FIG. 7b. An advantageous arrangement, however, is one in which the individual sectors 110 are united by small webs at the extreme ends 111 of the clamping sleeves 104, such that viewed from the entry end of the tendons 71 where the full tensile stress of the tendons is effective the transverse pressure applied to the tendons increases gradually, reaching its full value only in the interior of the anchorage pot 102.

In the end-anchoring device (shown in FIGS. 8a and 8b, the) 115 compression body 116 consists of the same material as in the device 100 of FIGS. 7a, b. However, owing to the closely spaced arrangement of a major number of tendons 117, totalling 16, within a roughly square cross-sectional area, one clamping body 118 filling the space between the tendons 117 and surrounding these on the outside is provided here instead of individual clamping sleeves. In the case illustrated by way of example, this clamping body may be made from a solid block of steel or aluminum which is first provided with longitudinal throughholes intended for receiving the tendons 117 and having diameters which are slightly larger than those of the tendons, which are assumed to be round bars, in order to achieve the previously mentioned gentle introduction of the load at the entry side of the device 115. Next, this block is provided with slots 120 and 121 which are sawed into the block from its one end face and made to intersect at right angles in the axes of the longitudinal holes 119. The depth of the slots 120 and 121 measured in the longitudinal direction of the clamping block 118 is selected so as to be approx. 1-2 mm smaller than the length of the clamping block, such that the latter remains united at its other end face, whereby application of the clamping block 118 to the tendons 117 is greatly facilitated. The device 115 has a cylindrical anchorage pot 122 which is closed by means of a bottom plate 123 at the entry side of the tendons 117. The holes 126 provided in the bottom plate for the passage of the tendons 117 are slightly larger in diameter than the tendons themselves. The arrangement of the clamping body 118 within the anchorage pot 122 is such that the undivided end of the clamping body is axially supported on the inner surface of the bottom plate 123. A compression plate 124 slidably guided at the opposite end of the anchorage pot 122 has a central cut-out 126 which is adapted to the cross-section of the clamping body 118 and through which the clamping body 118 and the free ends of the tendons protrude towards the outside. It is connected to a radially projecting flange 128 via a short length of spacing tube 127 whose length is approximately equal to the maximum compression of the compression plate 124. A corresponding radially projecting anchor flange 129 is formed by the radially projecting rim of the bottom plate 123 at the entry-side end of the device 115. Two tie rods 130 and 131 disposed between the flanges 128 and 129 in diametrically opposed positions outside the anchorage pot 122 provide the adjustable defined pre-stress compressing the compression body 116 in the axial direction in order to achieve the transverse pressure required for frictional anchorage of the tendons 117 in the clamping body 118.

As already explained in connection with the device 95 of FIG. 6a, a suitably reinforced poured body consisting of an epoxy resin reinforced with metal fibres or the like may be used instead of a "hard" clamping body 118 also in the device 115 of FIG. 8a. Such a body is conveniently poured "on the site" with the compression plate 124 removed by pushing it back a short distance along the tendons 117 in the direction of the tensioning head (not shown) which is also acting on the tendons 117.

If prefabricated clamping/compression bodies are used in conjunction with end-anchoring devices explained with reference to FIGS. 1–8b, such bodies may be installed as shown in the position on the tendons in which they are located before the latter are tensioned and then pushed into final position in the recesses provided in the concrete to receive them where their clamping elements will not be tensioned until the tendons have been tensioned first.

Further measures and design features which may be employed to advantage in connection with different embodiments of these devices as shown are as follows:

In cases where compression bodies consisting of polychloroprene or similar, comparatively soft materials are used, an advantageous arrangement is one in which closely spaced steel balls are molded into these compression bodies such that compression of the closely spaced balls embedded in the plastic alone would lead to a radial expansion of the latter. Aging effects or temperature influences which cause changes in the transverse pressures produced by means of the compression bodies can thus be effectively eliminated from the very beginning. Furthermore, tendons which have a coarsely textured surface roughness and which are retained in clamping sleeves or clamping bodies made of a very rigid material are conveniently provided with a sheathing 135 of an elastic material, such as lead or aluminum, which enables the gaps existing between the tendons and the clamping bodies to be filled uniformly by plastic deformation under the transverse pressure applied.

If, on the other hand, the contacting surfaces of both the tendons and the clamping sleeves or clamping bodies are very smooth and perfectly conforming, it may be advantageous to arrange between these surfaces a sheet of paper or plastic coated with fine-grained corundum grit on one side. When clamped with sufficient force, the corundum grit will pierce the sheet and penetrate into both the tendons and the clamping sleeves or clamping bodies in which they are enclosed. Friction between these bodies can be increased thereby and a better anchorage of the tendons can be achieved with a predetermined transverse pressure. The device 210 of the invention shown in FIG. 9, to which reference should be made for details, includes an externally cylindrical and internally conical anchorage pot 213 which is received in a cylindrical recess 214 of the prestressed concrete component 212 on the greater part of its length and which bears against the outer surface 217 of the pre-stressed concrete component 212 by means of a ring flange 216 disposed at its left-hand end as shown in FIG. 9. The tendons 211, e.g. round GC bars with a diameter of approx. 8 mm, extending through the anchorage pot 213 in the longitudinal direction, are disposed about the longitudinal axis 218 of the anchorage pot in a preferably radially symmetrical grouping with spaced relation to each other and may be pre-stressed to the required longitudinal tensile stress by means of a conventional jack (not shown). At its right-hand end as shown in FIG. 9, i.e. the end at which the tendons 211 enter into the anchorage pot 213, the anchorage pot is closed by means of a solid bottom plate 219 provided with openings 220 for the passage of the tendons 211.

In the cavity of the anchorage pot 213, which tapers from the outlet side towards the entry side of the tendons 211, the tendons 211 are embedded in a clamping body 221 in the form of a truncated cone on the greater part of their length. By displacement in the direction of the arrow 222 marking the direction of attack of the longitudinal tensile forces acting on the tendons, the clamping body 221 is subjected to a transverse pressure acting on the tendons 211 whose amount is proportional to the said displacement.

A buffer 224 of a compressible material, such as PVC (polyvinylchloride) or PS (polysterene) rigid expanded plastic filling the remaining cavity in the anchorage pot 213 is provided between the bottom plate 219 of the anchorage pot 213 and the smaller end face 223 of the clamping body 221 at the entry side.

For the purpose of further explanation it shall be assumed—without prejudice to a broader claim—that the clamping body 221 takes the form of a poured body consisting of an epoxy resin filled with mineral fillers and/or reinforced with steel fibres. To achieve a stable end anchorage of the GC tendons, the device 210 as described above may then be used as follows:

After the anchorage pot 213 has been brought into the position shown in FIG. 9 and the necessary pre-stress has been imparted to the tendons 211 by means of the jack (not shown), the clamping body 221 is poured with the plate-shaped buffer 224 of rigid expanded plastic initially acting as permanent "framework" which is not yet compressed, or at least not appreciably, under the hydrostatic pressure exerted by the poured mass. The pre-stress applied to the tendons 211 by means of the jack is maintained while the clamping body 221 is being poured. As soon as the poured clamping body 211 has become set or cured, the tensile force produced by the jack is reduced, preferably continuously or in small steps, or completely removed all at once if appropriate. Under the pre-stress of the tendons 211 acting increasingly on the clamping body, the clamping body 221 adhering to the said tendons is progressively drawn into the anchorage pot 213 in the direction indicated by the arrow 222 until the buffer 224, whose outer surface bears against the bottom plate 219 acting as a stop plate, has been compressed to a degree where the buffer, in turn, acts as a "hard" stop plate preventing further displacement of the clamping body in the axial direction. The result is a limitation of the transverse pressure applied to the clamping body 221, which increases continuously during displacement and which is transmitted to the tendons 211 and the final amount of which may be predetermined by suitable selection of the initial thickness of the buffer 224 in such a manner that the transverse pressure on the clamping body 221 and the tendons 211 which is required for frictional anchorage of the tendons is definitely reached while, on the other hand, any transverse pressure on the tendons 211 which exceeds a safety margin and would only reduce the ultimate strength of the tendons is dependably avoided.

As soon as the clamping body 221 has reached the final position indicated by the broken lines in FIG. 9 in which no further appreciable displacement of the tendons 211 occurs relative to the pre-stressed concrete body 212, the pre-stressing duct 226 and, if applicable, the recess 214 of the pre-stressed concrete component 212 which receives the anchorage pot 213 may be grouted with a suitable compound.

Gentle anchorage of the tendons by limiting the displacement of their clamping body 232 relative to the anchorage pot 233 is also achieved by means of the preferred embodiment of an end-anchoring device 230 for a plurality of GC tendons 231 shown in FIG. 10, to which reference should be made for details.

With respect to the arrangement of the GC tendons 231, the internal taper of the anchorage pot 233, the arrangement of the anchorage pot in a recess 214 of the pre-stressed concrete component 212 and the manner in which it is supported on the outer face 217 by means of a ring flange 216 as well as with respect to the design of the clamping body 232 as a poured part taking the form of a truncated cone which is complementary to the internal taper of the anchorage pot 233, the design of the device 230 may be completely analogous to that of the device 210 in accordance with FIG. 9.

In FIG. 10 it will be noted that the clamping body 232 is disposed between an abutment plate 234 at the entry side and a stop plate 236 at the outlet side which may be secured to each other against the action of tensile forces by means of a tie rod 237 whose head 238 bears against the outer surface of the abutment plate 234 and whose tightening nut 239 is directly or indirectly supported on the outer surface of the stop plate 236. The tie rod 237 extending through the clamping body 232 along the central longitudinal axis 240 of the device 230 as shown in FIG. 9 is dimensioned to resist the full longitudinal tensile force introduced into the device 230. It is conveniently made from high-strength steel, such as Grade 8.8. The abutment plate 234 and the stop plate 236 are provided with aligned openings 241 and 242 respectively for the passage of the GC tendons 231, the inside width of these openings being slightly larger than the diameter of the tendons 231. The diameter of the abutment plate 234 is slightly smaller than the smallest inside diameter of the anchorage pot 233 on that portion of its length within which the abutment plate 234 must be displaceable. The diameter of the stop plate 236, whose maximum axial distance from the abutment plate 234 and the outlet-end face 243 of the anchorage pot 233 may be adjusted by means of the tightening nut 239, is appreciably greater than the inner diameter of the anchorage pot 233 at its outlet end so that the stop plate limits the draw-in travel of the clamping body 232 by moving into contact with the end face 243 of the anchorage pot 233.

In order to achieve a stable end-anchorage of the GC tendons 231, the device 230 as described above may be used as follows:

After the anchorage pot 233 has been brought into the position shown in FIG. 10 and the necessary pre-stress has been imparted to the tendons by means of the jack (not shown), the abutment plate 234 is brought into the position indicated by the broken lines in FIG. 10 and sufficiently fixed in this position by means of the tie rod 237. The next step is to produce the clamping body 232, preferably by pouring a suitable compound filling the entire cavity existing between the abutment plate 234 and the outlet end of the anchorage pot 233. A sealing body 246 in the form of a flat plate provided between the abutment plate 234 and the clamping body prevents the jointing compound from penetrating through the peripheral gaps between the anchorage pot 233 and the abutment plate 234 and the abutment plate and the tendons 231. After setting or curing of the clamping body 232 the draw-in displacement of the clamping body 232 is initiated by reducing the tensile force produced by the jack as previously explained in connection with the device 210 of FIG. 9. In the case of the device 230, the optimum amount of this displacement from the point of view of a gentle, but nevertheless sufficiently safe anchorage of the GC tendons can be predetermined in various different ways:

One way to achieve this is by predetermining the effective length of the tie 237, in which case the maximum distance to which the stop plate 236 may move away from the end face 243 is fixed by appropriately adjusting the tightening nut 239. Another way is by supervising the pre-stressing force reduced continuously or in steps by means of the jack and the locking engagement of the stop plate 236 at a predetermined pressure. In both cases, the tendons 231 must be initially overstressed by a predetermined amount in order to compensate for the relaxation resulting from the displacement of the clamping body 232.

As indicated in FIG. 10 by a cup spring arrangement 247, the tightening nut 239 may be supported on the stop plate 236 via a resilient element which must be designed so that its elastic force corresponds to the tensile force to be absorbed at approximately one half of its maximum elongation or a smaller fraction thereof.

This resilient member 247 provides a displacement "reserve" which is utilized when the volume of the clamping body 232 is reduced by a time-delayed shrinking process or the like, which in the case of a rigid connection between the abutment plate 234 and the stop plate 236 would result in a reduction of the transverse pressure applied to the clamping body 232 and, thus, in a reduction of the frictional fixation of the tendons 231.

It is obvious that the recess 214 of the pre-stressed concrete component 212 receiving the anchorage pot 233 may not be fully grouted with a jointing compound in the area adjacent to the abutment plate 234 if the tie rod 237 is resiliently supported on the stop plate 236. To prevent this, the entry-side end of the anchorage pot 233 must be closed with a bottom plate 249 provided with narrow openings 248 for the passage of the GC tendons 231 or sealed with a plate of rigid expanded plastic, for example.

It is also obvious that instead of poured clamping bodies clamping bodies made of other materials and slotted longitudinally, including clamping bodies which only enclose the GC tendons in sectoral areas of their circumference, may be used as part of a device in accordance with the invention and that a plurality of tie rods, including tie rods extending outside the anchorage pot, may be provided instead of only one central tie rod.

Furthermore it may be convenient to support the anchorage pot directly on the pre-stressed concrete component at the side where the tendons enter into the pot, e.g. via a bottom plate, instead of supporting it by means of an external ring flange.

The end-anchoring device 310 of the invention shown in FIGS. 11 and 12, to which reference should be made for details, includes a conical anchorage pot 313 received in an also conical recess 314 of the pre-stressed concrete component 312 on the greater part of its length and supported on the outer face 317 of the pre-stressed component 312 by means of a ring flange 316 at its left end as shown in FIG. 12.

The anchorage pot 313 is preferably made from steel and the space between the anchorage pot 313 and the slightly larger recess 314 is filled with grouting mortar in the completely installed condition of the device 310. Alternatively, the anchorage pot 313 may be an injection molded plastic component made of polyamide or hard polysterene, for example, which is simultaneously utilized as framework for the recess 314 of the pre-stressed concrete component 312.

The tendons 311, e.g. round glass fibre compound bars with a diameter of approx. 8 mm, which extend through the anchorage pot 313 in its longitudinal direction, are disposed about the longitudinal axis 318 of the pot in a preferably radially symmetrical grouping and may be pre-stressed to the required longitudinal tensile stress by means of a conventional jack (not shown).

At its right-hand end as shown in FIG. 12, i.e. the end at which the tendons 311 enter into the anchorage pot 313, the anchorage pot is closed by means of a solid plate 319 provided with passage openings 320 for the tendons 311 and clamping sleeves 321 enclosing the tendons. In the cavity of the anchorage part 313 which tapers from the outlet side towards the entry side of the tendons 311, the tendons or, more precisely, their clamping sleeves 321 are embedded in a clamping body 322 in the form of a truncated cone on the greater part of their length. By displacement in the direction of the arrow 322 marking the direction of attack of the longitudinal tensile forces acting on the tendons 311, the clamping body 322 is subjected to a transverse pressure which is transmitted to the tendons 311 by the clamping sleeves 321 and the amount of which is proportional to the displacement of the clamping body 322. The clamping body 322 is a poured component made of an epoxy resin-based or other suitable material which is pressed into contact with the conical internal wall 324 of the anchorage pot 313 over the full anchoring length by axial compression.

Except for a small peripheral gap 326, the wide opening of the anchorage pot 313 at the outlet end is covered by a solid pressure plate 328 bearing against the outlet end base surface 327 of the clamping body 322. This pressure plate is provided with narrow passage openings 329 for the clamping sleeves 321 which enclose the tendons and bear against the outer surface 322 of the pressure plate 328 by means of radially projecting flange pieces 331, the passage openings in the pressure plate 328 being aligned with those in the bottom plate 319.

In the embodiment shown by way of example, the clamping sleeves 321 take the form of steel or aluminum tubes with a wall thickness of approx. 2-4 mm. The shell 333 of these clamping sleeves is again divided into sectors by means of radial longitudinal slots 334 extending from the outlet-end face to at least a point coinciding approximately with the start of the end portion 336 extending through the bottom plate 319, said sectors being united at the tubular end portion 336, which is approx. 2 cm long.

A buffer 338 of a compressible material, such as PVC (polyvinylchloride) or PS (polysterene) rigid expanded plastic filling the remaining cavity in the anchorage pot 313 is provided between the bottom plate 319 of the anchorage pot 313 and the smaller base surface 337 of the clamping body 322 at the entry side.

To achieve a stable end anchorage of the GC tendons, the device 310 as described above may be used as follows:

After the anchorage pot 313 has been brought into the position shown in FIG. 11 and the necessary pre-stress has been imparted to the tendons 311 by means of a jack (not shown), the clamping body 322 is poured with the plate-shaped buffer 338 initially acting as "permanent framework" which is not yet compressed, or at least not appreciably, under the hydrostatic pressure exerted by the poured mass. The pre-stress applied to the tendons 311 by means of the jack is maintained while the clamping body 322 is being poured. As soon as the poured clamping body 322 has become set or cured, the tensile force produced by the jack is reduced, preferably continuously or in small steps, or completely removed all at once if appropriate. Under the pre-stress of the tendons 311 acting increasingly on the clamping body 322, the clamping body 322 is progressively pushed into the anchorage pot 313 in the direction indicated by the arrow 323 until the buffer 338 has been compressed to a degree where, being supported on the bottom plate 319, it acts as a "hard" stop plate preventing further displacement of the clamping body in the axial direction. The result is a limitation of the transverse pressure applied to the clamping body 322 and transmitted to the tendons 311 via the clamping sleeve 321 which increases continuously during displacement of the clamping body and whose minimum amount required for safe anchorage of the tendons 311 may be predetermined by a suitable selection of the initial thickness of the buffer 338. If the total tensile force transmitted by the tendons 311 increases in response to a load applied to the pre-stressed concrete component 312, the clamping body 322, into which the said tensile force is introduced via the pressure plate 328 because the clamping sleeves 321 are supported on the outer surface of the said pressure plate, is subjected to more or less strong compression depending on the mechanical properties of the material selected for it. This compression is accompanied by an increase in the transverse pressure applied to the clamping body 322 which, in the case of the design illustrated in FIG. 12, is readily distributed very uniformly over the anchoring length of the tendons 311.

In the embodiment shown by way of example in FIGS. 13 and 14, to which reference should be made for details, the tendons 411 and 412 are approx. 8 mm thick round bars disposed horizontally and symmetrically with respect to the horizontal longitudinal centre plane 414 of the device 410 in a total of 5 parallel rows of 7 tendons 411 and 412 each beside and above each other, with the central row including unrestrained members with properties comparable to those of the tendons 412 in addition to the tendons 412 for a reason still to be explained. The central component of the device 410, which is generally symmetrical with respect to both the horizontal longitudinal centre plane 414 and the vertical longitudinal centre plane 416 is a clamping body generally denoted by the numeral 430, which is comprised of clamping plates 418-425 and flat wedges 426-429 in the stacked arrangement shown in FIG. 13. In its service position shown in FIG. 13, this clamping body is received, on the greater part of its length, in a recess 431 of the pre-stressed concrete component 413 or in an anchorage pot 432 inserted in the said recess. Subjected to sufficient transverse pressure, this clamping body provides for frictional anchorage of the tendons 411 and 412.

The clamping body elements 418-429 are conveniently applied to the tendons 411 and 412, in stacked arrangement, before a necessary tensile pre-stress is imparted to the tendons 411 and 412 by means of a conventional jack (not shown) and then pushed into the shown final position in the recess 431 of the anchorage pot 432 from the outlet end of the tendons. The clamping plates 418-425, between which the four outer rows of tendons 411 are retained, and the flat wedges 426 and 429, which taper towards the outlet side of the tendons 411 and 412, i.e. towards the left in FIG. 13, in contact with the central flat wedges 427 and 428 between which the central row of tendons 412 is retained, are provided with laterally projecting flange pieces 433 at their end portions outside the recess 431. These flange pieces introduce the tendon forces into an abutment plate 436, which bears against the outer face 434 of the concrete component 413 and surrounds the opening of the recess 431, and prevent further axial displacement of the clamping body elements 418-426 and 425-429 towards the entry side of the tendons 411 and 412, i.e. towards the concrete component 413.

The central flat wedges 427 and 428 enclosing the tendons 412 of the central row together from an axially displaceable wedge body whose wedge angle corresponds to the opening angle of the V-shaped gap increasing in size towards the outlet side of the tendons 412 and delimited by the inner wedge faces 437 and 438 of the outer flat wedges 426 and 429.

By forcing this wedge body 427, 428 into the V-shaped gap 437, 438, the clamping body elements 418-429 supported perpendicularly to the axes of the tendons 411 and 412 between opposite walls 439 and 441 of the recess 431 or the anchorage pot 432 and the tendons 411 and 412 disposed between these clamping body elements may be compressed until the minimum transverse pressure required for a safe anchorage of the tendons 411 and 412 under service load conditions is being applied to these parts 411 and 412 and 418-429, whereupon the jack employed to maintain the tendons 411 and 412 at the necessary tensile stress may be removed.

The device 410 as described above has the following functional properties:

Of the tensile forces occurring when the concrete component 413 is subjected to loading and introduced into the end-anchoring device 410 via the tendons 411 and 412, an increase in the transverse pressure applied to the tendons results only from that load-dependent portion of the tensile force which acts on the central tendons 412. Thus, if the tendons 411 and 412 are identical in design and if the tendons in the clamping body 430 are subjected to uniform transverse pressure, that portion of the tensile force which determines the increase in transverse pressure is to the total tensile force to be absorbed by the end-anchoring device as the number of central tendons 412 is to the total number of tendons 411 and 412. This means that a defined ratio at which an increase in the tensile forces acting on the tendons 411 and 412 causes an increase in the transverse pressure applied to the tendons 411 and 412 can be predetermined and kept at a low value suited to the long-time load carrying capacity of the tendons 411 and 412 by a suitable selection of this numerical relationship. In the case of the special embodiment of the invention shown here by way of example, the value of this translation ratio would be only one fifth of the value which must be tolerated with the wedge or poured anchoring systems of the prior art, in which all of the tensile forces introduced into the anchoring system contribute to the transverse pressure applied to the tendons, if all of the bars disposed between the flat wedges 427 and 428 were acting as tendons 412. However, in order to achieve a further reduction in the ratio of transverse pressure or transverse force to tensile force as required in practice for the wedge angles shown in this example, some of the bars retained between the central flat wedges 427 and 428, such as the four bars identified by the broken-line shading in FIG. 14, are, in fact, unrestrained and only three bars act as tendons 412, whereby the numerical relationship referred to above is reduced to less than 1/10.

In the embodiment of the invention shown by way of example, the clamping body elements 418-429 are preferably made of steel, although they may also consist of any other material of sufficient strength to resist the forces that must be transmitted in the longitudinal direction. The clamping plates 418-425 and the central flat wedges 427 and 428 are provided with grooves 442 and 443 for receiving the tendons 411 and 412 on the sides facing said tendons 411 and 412. The tendons are embedded in these grooves with a snug fit and enclosed by the walls of the grooves on the greater part of their circumference, such that only narrow, approx. 1 mm wide gaps 444 and 446 remain between the sides of the clamping plates 418-421 and 422-425 and the central flat wedges 427 and 428 facing the tendons 411 and 412.

In the embodiment of the invention shown by way of example in FIGS. 13 and 14, the clamping body 430 generally has approximately the basic form of a cuboid, in which the outer surfaces 447 and 448 of the outermost clamping plates 418 and 425, by means of which the clamping body 430 bears against opposite inner walls of the recess 431 or the anchorage pot 432, extend in plane-parallel relation to each other. Obviously, these inner walls 439 and 441 should also be as parallel to each other as possible to ensure a largely uniform distribution of the transverse pressure at the tendons 411 and 412 over the anchorage length of the latter. This is no problem if the clamping body 430 can be inserted into an anchorage pot 432, as shown in the lower part of FIG. 13, which in turn is installed in a correspondingly wider recess of the concrete component 413, since on such a part, which may be prefabricated as a hollow steel section, for example, the plane-parallelism of the supporting surfaces 439 and the inside dimensions of the anchorage pot required for the anchoring position of the clamping body 430 as shown in the drawing are easy to control from a manufacturing point of view. In this case, moreover, the inside dimensions of the recess 431 receiving the anchorage pot 432 need not meet any stringent requirements, since any cavity remaining between the anchorage pot 432 and the longitudinal walls of the recess 431 would be communicating with the pre-stressing duct 449 at the entry side of the tendons 411 and 412 so that it can be grouted after moving the anchoring device 410 into its service position, with the result that the device 410 will be dependably retained in its desired position even if the longitudinal walls of the recess 431 of the concrete component are not perfectly parallel to each other and/or featuring considerable surface roughness. If, however, the recess 431 of the concrete component 413 itself is to be utilized as "anchorage pot" for the clamping body 430, as shown in the upper part of FIG. 13, then an advantageous arrangement is one in which an approx. 2-4 mm thick compensating layer 450 of resilient material, such as neoprene, is provided between at least one of the outer clamping plates 418 or 425 and the adjacent supporting surface 439 so that the parallel position of the clamping plates 418-425 and the central flat wedges 427 and 428 required to ensure a uniform distribution of the transverse pressure over the anchoring length of the tendons 411 and 412 will be obtained automatically even if the said supporting surfaces 439 of the concrete component are not perfectly level or not perfectly parallel to each other. Alternatively, a compensating layer 451, whose function is equivalent to that of the compensating layer 450, may be provided between adjacent surfaces of the clamping plates 419 and 420 or 423 and 424 or, as indicated by the broken lines in FIG. 13, between one of the inner clamping plates 421 or 422 and the adjacent flat wedge 426 or 429 defining one side of the V-shaped gap in which the central flat wedges 427 and 428 are seated.

Surface roughness of the tendons 411 and 412 originating from the production of these parts, which are made of compound material, may lead to localized peaks of transverse pressure exceeding the permissible limit if these tendons are compressed between smooth clamping body elements. It is therefore an advantage if the tendons 411 and 412 are embedded in a slightly elastic adhesive layer 452 or 453 which tends to hug the surface of the tendons, compensating for irregularities of both the clamping body elements and the tendons, thereby ensuring a uniform distribution of the transverse pressure over the anchoring length, as shown in FIG. 15. A suitable material for such an adhesive layer would be a material capable of plastic deformation or an elastomer reinforced with metal or glass fibre or ceramic fillers. The adhesive layer 452 or 453 may either take the form of an approx. 1-2 mm thick coating of the tendons 411, as shown in the lower part of FIG. 15, or of a coating of the clamping body elements, as shown in connection with the central flat wedges 427 and 428 and the clamping plates 418-421 disposed above them, in which case the adhesive layers 453 and 454 take the form of semi-shells, each enclosing one half of the circumference of the tendons 412 and 411. These coatings 453 and 454 of the clamping body elements may be either comparatively thin layers 454 conforming to the contour of receiving grooves 442 or comparatively solid plates 453 which may be recessed into the clamping body elements and whose thickness is at least approx. 1 mm greater than half the diameter of the tendons 411 and 412, which will then dig into these adhesive layers when the clamping body 430 is compressed. A favorable arrangement is one in which the surfaces of the clamping body elements 418-425 and 427 and 428 located adjacent to the adhesive layers 452-454 are given a defined roughness to achieve improved adhesion of the tendons 411 and 412 and the clamping body 430 at a predetermined transverse pressure and a reduction of the minimum transverse pressure required for frictional anchorage at the tendons 411 and 412 with favorable results as regards their protection. If adequately dimensioned in thickness, the adhesive layers 452-454 will also provide the function performed by the compensating layers 450 and 451. In the embodiment of an end-anchoring device 460 of the invention shown in FIG. 16, the desired limitation of the increase in transverse pressure at the tendons 411 and 412 as a function of the tensile forces to which they are subjected is again achieved by a suitable selection of the numerical relationship between the tendons 412, which are frictionally retained on a wedge-shaped clamping body element 461 disposed for displacement in the axial direction of the device 460, and the tendons 411, which are frictionally retained on a clamping body element 464 supported to prevent it from being displaced in the axial direction, such that the device 460 of FIG. 16 is cpmpletely analogous to the device 410 of FIGS. 13-15 in this respect. Consequently, elements of the device 460 in accordance with FIG. 16 performing the same or analogous functions as those performed by their counterparts in the device 410 of FIGS. 13-15 are identified by means of the same numerals, and in order to avoid repetition, only the structural differences between the device 460 and the device 410 will, on the whole, be discussed below.

The device 460 includes an externally cylindrical and internally conical anchorage pot 463 which is received in a cylindrical recess 431 of the pre-stressed concrete component 413 on the greater part of its length and which bears against the outer surface 434 of the pre-stressed concrete component 413 by means of a ring flange 464 disposed at its left-hand end as shown in FIG. 16. The tendons 411 and 412 extending through the anchorage pot 463 in the longitudinal direction are disposed about the longitudinal axis 466 of the device 460 in a preferably radially symmetrical grouping. At its right-hand end as shown in FIG. 16, i.e. the end at which the tendons 411 and 412 enter into the anchorage pot 463, the anchorage pot is closed by means of a solid bottom plate 467 provided with openings 468 for the passage of the tendons 411 and 412. Both the wedge-shaped component 461 having the form of an externally conical and internally cylindrical sleeve and the central cylindrical clamping body component 462 may be poured parts produced on the site which are separated by means of an approx. 0.5-1 mm thick sheathing 469 enhancing the sliding properties which is preferably made of steel, aluminum or plastic and utilized as "permanent formwork". This sheathing 469 is conveniently divided into shell sectors by means of narrow longitudinal slots in order to enable it to transmit, in preferably quantitive relationship, the transverse forces resulting from an axial displacement of the wedge-shaped component 461 in the direction indicated by the arrow 470 which provide the transverse pressure required for frictional anchorage or the tendons 411 and 412 and the clamping body 430 embracing the wedge-shaped component 461 and the component 462.

A buffer 472 of a compressible material, such as PVC (polyvinylchloride) or PS (polystyrene) rigid expanded plastic also used as "permanent formwork" during production of the wedge-shaped component 461 is provided between the bottom plate 467 of the anchorage pot 463 and the smaller base surface 471 of the wedge-shaped component 461 at the entry side. This buffer 472 ensures that the wedge-shaped component is displaceable in the axial direction. It may be designed in a manner enabling it to offer additional resistance to axial displacement of the wedge-shaped component 461 in the direction indicated by the arrow 470 and, thus, also oppose the application of increased transverse pressure to the clamping body 30 and the tendons 411 and 412. The device 510 of the invention shown in FIG. 17, to which reference should be made for details, includes a cylindrical anchorage pot 513 received, on the greater part of its length, in an also cylindrical recess 514 of the concrete component 512, whose central bottom area connects to the pre-stressing duct 516 of the concrete component 512 through which extend the tendons 511. At its inner end facing the pre-stressing duct 516, i.e. at the end where the tendons 511 enter into the anchoring device 510, the anchorage pot 513, through which the tendons 511 and the clamping sleeves 517 surrounding said tendons extend longitudinally, is closed by means of a bottom plate 519 provided with openings 518 for the passage of the tendons 511 and the clamping sleeves 517 surrounding said tendons. At its outer end, i.e. the end where the tendons 511 protrude from the device 510, the anchorage pot 513 is provided with a radially projecting ring flange 521 by means of which it bears against the external wall portion 522 of the pre-stressed concrete component 512 delimiting the opening of the recess 514 at the outlet end. Except for a narrow peripheral gap 523, the outlet-end opening of the anchorage pot 513 is covered by a compression plate 526 supported at the outer end of the cylindrical shell 424 of the anchorage pot 513 so as to be parallel to the bottom plate 519 and displaceable in the longitudinal direction of the tendons 511. This compression plate, in turn, is provided with passage openings 527 for the clamping sleeves 517 embracing the tendons 511 in alignment with the passage openings 518 in the bottom plate 519. The clamping sleeves 517, which take the form of substantially longish tubes, are provided with flange pieces 528 projecting radially from the sleeve shell at their outlet-side end by means of which they bear against the outer surface 529 of the compression plate 526 in the service position of the device 510 shown in the drawing. The remaining cavity between the compression plate 526 and the bottom plate 519, which is enclosed by the cylindrical shell 524 of the anchorage pot 513, is filled with a body 530 made of a material which can be expanded by compression, such as polychloroprene, sulfochlorinated polyethylene or the like, which transforms axial tensile or pre-stressing forces in the interior of the anchorage pot 513 tending to displace the compression plate 526 towards the bottom plate 590 into a "hydrostatic" pressure proportional in amount to these forces and, thus, also into transverse forces directed transversely to the clamping sleeves 517 and the tendons 511 so that, if the compression body 530 is sufficiently compressed, sufficient transverse pressure for the frictional fixation of the tendons 511 is applied to the clamping sleeves 517. In order to enable sufficient transverse pressure to be applied to the compression body 530, the clamping sleeves 517 and the tendons 511 at a predetermined service load to be adjusted without using additional means (jack), pre-stressing means 531 are provided which may be operated from the outside of the device 510. In FIG. 17, these pre-stressing means take the form of a single tie rod extending along the central longitudinal axis 532 of the device 510. This tie rod, whose head 534 is supported on the outer surface 536 of the bottom plate 519 at the opposite end and whose shaft 537 passes through aligned holes 538 and 539 in the bottom plate 510 and the compression plate 526 respectively, may be tensioned by means of the tightening nut 533 supported on the outer surface of the compression plate 526.

The device 510 described above may be used as follows: First, the end-anchoring device 510 comprised of the anchorage pot, the compression body 530, the compression plate 529, the clamping sleeves 517 and the pre-stressing means 531 is applied to the tendons 511 grouped about the central longitudinal axis 532 in a preferably radially symmetrical arrangement and, if convenient, immediately pushed into the recess 514 of the pre-stressed concrete component 512 so as to move the anchorage pot 513 into its final position as shown in the drawing, whereupon the intended amount of pre-stress for the concrete component 512 can be imparted to the tendons 511 by means of a conventional jack (not shown). After operating the pre-stressing means 531, the jack is removed so that the transverse pressure at the clamping sleeves 517 and the tendons themselves which is required for safe anchorage of the tendons 511 is achieved through the action of the compression plate 526 expanding to a state of equilibrium. Next, the remaining cavity between the anchorage pot 513 and the recess 514 of the concrete component 512 and the pre-stressing duct 516 surrounding the tendons may be grouted with injection mortar or some other suitable compound, although this step may also be performed prior to operation of the pre-stressing means 531 if more convenient. Increased tensile forces occurring under load and introduced into the anchoring device 510 via the clamping sleeves 517 and the compression plate 526 cause an increase in the transverse pressure. Since the increase per unit of tensile force is determined by the dimensions of the compression body and its mechanical properties, it may be varied within wide limits by a suitable selection of these parameters in the design stage and, thus, adjusted to the optimum value for each application. The embodiment of a device 540 of the invention shown in FIG. 18 is completely analogous to the device 510 shown in FIG. 17 in terms of its proposed use, i.e. end-anchorage of tendons 511, and the principle employed to limit the ratio of load to transverse pressure. Accordingly, elements of the device 540 of FIG. 18 performing the same or analogous functions as their counterparts in the device 510 of FIG. 17 have been denoted with the same numerals.

The device 540 of FIG. 18 lends itself, in particular, to end-anchoring a bundle of tendons 511 grouped in closely spaced, preferably axially symmetrical distribution about the central axis 541 of the device 540. The tendons are seated in a generally block-shaped clamping sleeve body 542 made of steel or aluminum and provided with longitudinal slots ensuring the transverse resilience required to transmit the transverse pressure to the tendons 511. In the embodiment shown by way of example, the slots, which are sawed into the block preferably from the outlet-side end face 544 of the clamping sleeve body 543, end within a few millimeters of the entry-side end face 546 of the clamping sleeve body, so that the component parts of the clamping sleeve body 542 are only in contact with sectoral areas of the tendon shells and united at the entry side of the tendons 511, which can be an advantage, in particular for the installation of the device 540. In accordance with the compact design of the clamping sleeve body 542, the bottom plate 519 and the compression plate 526 are each provided with a single central opening 547 and 550, respectively, for the passage of the clamping sleeve body 542 which is again supported on the outer surface 529 of the compression plate 526 by means of peripheral radial flange pieces 528. The anchorage pot 513 of preferably radially symmetrical design with respect to the central axis 541 is appresiably larger in diameter in its outer cylindrical portion 547, in which the compression plate 526 is disposed in a manner permitting it to be displaced, than in its inner cylindrical portion 548 closed by the bottom plate 547. In the arrangement shown in FIG. 18, a funnel-shaped intermediate portion 551 disposed between a bottom plate of the outer cylindrical portion 547 in the form of a ring flange extending parallel to the compression plate 526 at the one end and the shell of the inner cylindrical portion 548 of the anchorage pot 513 at the other end links the outer cylindrical portion 547 to the inner cylindrical portion 548, with the conical internal surface 552 of the said funnel-shaped intermediate portion blending smoothly into the inner surface of the bottom plate 549, which takes the form of a ring flange, and the inner shell surface 554 of the inner anchorage pot portion 548 respectively. The dimensions of the anchorage pot 513 and the clamping sleeve body 542 are such that the compression body 530 has approximately the same volume both in the narrower portion 548 and the wider portion 547 of the anchorage pot 513 and that the depth of the wider portion 547 measured between the compression plate 526 and the ring-shaped bottom flange plate 549 is approx. one tenth to one fifth of the total length of the device 540. With respect to handling and function, the device 540 is analogous to that of FIG. 17. Tie rods 556 provided in the wider portion 547 of the anchorage body 513 and arranged as shown in FIG. 18 may be used to adjust a minimum transverse pressure applied to the tendons 511 and the clamping sleeve body 542.

A slight outside taper of the clamping sleeve body 542 towards the entry side of the tendons 511 will facilitate installation of the device 540, because it makes it easier to insert the compression body 530 which is preferably a prefabricated component. If necessary, the compression body 530 may be a sandwich structure of overlying layers 557–560 as indicated by the broken lines. If these layers 557–560 have different deformation properties, such as progressive degrees of hardness, a predetermined behavior of the compression body 530 in terms of transverse pressure can be obtained over the anchoring length of the tendons 511 by a suitable selection of such different properties, an advantageous arrangement being one in which the hardness of the overlying layers 557–560 decreases from the entry side of the tendons 511 to the outlet side.

The characteristic advantage of the device 540 in accordance with FIG. 18 consists in that it combines a generally slender and space-saving design with a large area of contact between the compression plate 526 and the compression body 530 so that the tensile forces transmitted by the tendons 511 can be readily transformed into proportional transverse pressures at low translation ratios.

What we claim is:

1. An end-anchoring system for anchoring at least one bar made from a fibrous compound material and being used as a tendon in pre-stressed concrete construction, comprising an anchorage pot arranged for being fixed at a pre-stressed concrete component and containing a clamping body which extends over a portion of the length of the bar and encloses the latter and upon which transverse forces acting perpendicularly to the longitudinal axis of the bar and producing a frictional connection between the rod and the clamping body and the anchorage pot, respectively, can be exerted, the clamping body being part of translating means for transforming axial forces into transverse forces and serving to transform forces acting upon the device in the longitudinal direction of the bar into proportional transverse forces providing the frictional connection between the rod and the clamping body, wherein, as part of a means for producing the axial forces which are transformed into the transverse forces providing the frictional connection between the rod and the clamping body, at least one clamping element, in the form of a tie rod, is provided that acts upon two members of the axial force producing means that are axially displaceable relative to each other and disposed between a head and a tightening nut of the clamping element, tightening of the tie rod nut being operable for causing an axial displacement of at least one of said two members relative to the other and an axial force in proportion to said displacement, and in that a resilient body in the form of a cup spring arrangement is disposed between the tightening nut and said one of the two members in a manner that the tightening nut bears against the one of the said two members of the axial force producing means via said cup spring arrangement, whereby said cup spring arrangement serves as a threshold member limiting said transverse forces to a preset level.

2. A device in accordance with claim 1, wherein the translating means for translating the axial tensional force produced by the clamping element into a transverse pressure to be transmitted to the tendon comprises at least one pair of wedge plates which can be mutually interlocked by means of the clamping element.

3. A device in accordance with claim 2, wherein adjacent wedge faces of the wedge plates are provided with oppositely arranged groove-shaped recesses delimiting a channel extending in the longitudinal direction of the device and enclosing the shaft of said tie rod, the head of which rests against the back of one of the wedge plates, constituting said one of the members of the axial force producing means, and can be fixed by means of the tightening nut which, in turn, bears against the back of the other wedge plate, constituting the other of said axial force producing members, via the resilient body formed by the cup spring arrangement.

4. A device in accordance with claim 1, wherein the force translating means comprises a conical sleeve which extends in the longitudinal direction of the anchorage pot and which is expandable by insertion of a wedge body taking the form of a truncated cone, the tie rod extending in the longitudinal direction through the wedge body and acting upon a point located between an outer base of the wedge body and a remote end face of the conical sleeve.

5. A device in accordance with claim 1, wherein the clamping body is radially expandable by axial compression and is arranged between two pressure plates forming the two members of the axial force producing means which are axially displaceable with respect to one another, one of these plates being provided on an entry side and the other on an outlet side of the anchorage pot, and wherein at least one of the said pressure plates is guided on an end portion of the anchorage pot so as to slide in the axial direction and is pressable against the other of the said plates and the expandable clamping body, at a force that can be adjusted in a defined manner by means of the clamping element, the said clamping body filling the whole free space in the area between the compression plates and between the tendon within the cavity of the anchorage pot, at least when said preset level of transverse forces is reached.

6. A device in accordance with claim 5, wherein the compression body and the compression plates are provided with a number of passage channels and entry and outlet openings for a corresponding number of tendons.

7. A device in accordance with claim 6, wherein the compression body is provided with a central channel arranged coaxially to the openings in the compression plates and serving as passage for the shaft of the tie rod, the head of said tie rod being supported on the compression plate located on the outlet end and which can be tightened by means of the tightening nut which bears, via the cup spring arrangement, against the central portion of the compression plate provided on the outlet side, and that the passage channels for the tendons are grouped in a radially symmetric arrangement around the central channel.

8. A device in accordance with claim 6, wherein the passage channels for a number of tendons are arranged in the central cross-sectional area of the anchorage pot, near its axis, and that clamping elements are provided in radially symmetric arrangement, at one of the outside of the pot and in channels within the clamping body.

9. A device according to claim 1, wherein the tightening nut is arranged at an outlet side of the anchorage pot.

10. A device according to claim 4, wherein said conical sleeve is formed of a plurality of sector-shaped segments.

* * * * *